US010156372B2

(12) United States Patent
Keough et al.

(10) Patent No.: US 10,156,372 B2
(45) Date of Patent: Dec. 18, 2018

(54) MOISTURE PUMP FOR ENCLOSURE

(71) Applicant: W. L. Gore & Associates, Inc., Newark, DE (US)

(72) Inventors: Michael Keough, Newark, DE (US); Earl Ball, Middletown, DE (US); Jeffrey C Williams, Elkton, MD (US)

(73) Assignee: W.L. Gore & Associates, Inc., Newark, DE (US)

(*) Notice: Subject to any disclaimer, the term of this patent is extended or adjusted under 35 U.S.C. 154(b) by 179 days.

(21) Appl. No.: 15/176,266

(22) Filed: Jun. 8, 2016

(65) Prior Publication Data

US 2016/0363331 A1   Dec. 15, 2016

Related U.S. Application Data

(60) Provisional application No. 62/173,073, filed on Jun. 9, 2015.

(51) Int. Cl.
*B01D 53/02* (2006.01)
*F24F 3/14* (2006.01)
(Continued)

(52) U.S. Cl.
CPC ........ *F24F 3/1429* (2013.01); *B01D 53/0446* (2013.01); *B01D 53/261* (2013.01);
(Continued)

(58) Field of Classification Search
CPC .......... B01D 2253/106; B01D 2257/80; B01D 2258/06; B01D 2259/40003;
(Continued)

(56) References Cited

U.S. PATENT DOCUMENTS 4,809,144 A   2/1989   Suzuki
4,985,296 A   1/1991   Mortimer, Jr.
(Continued)

FOREIGN PATENT DOCUMENTS

DE   102006028295 A1   12/2007
EP        1818609 A2    8/2007
WO     WO-9727042 A1    7/1997
WO   WO-2013/110990 A2   8/2013

OTHER PUBLICATIONS

Translation of EP-1818609 A2; Aug. 15, 2007; Hella.*
International Search Report and Written Opinion for International Application No. PCT/US2016/036597 dated Sep. 12, 2016.

*Primary Examiner* — Christopher P Jones
(74) *Attorney, Agent, or Firm* — Greenberg Traurig, LLP

(57) ABSTRACT

Systems including a moisture pump for removing moisture from an inside environment to an outside environment. The moisture pump includes a housing defining a heating chamber and a condensation chamber. Maintained by the housing is a desiccant, a heater, and a heat sink for selectively adsorbing water vapor in the heating chamber when the heater is off and desorbing water vapor into the heating chamber when the heater is on. A valve assembly is also maintained by the housing transitionable between an adsorption position and desorption position. The adsorption position allows water vapor to be selectively transmitted into the heating chamber from the inside environment. The desorption position allows water vapor to be transmitted from the heating chamber into the condensation chamber for transmission into the outside environment, respectively. Insulation is optionally used around the heating chamber to increase desiccant desorption efficiency.

21 Claims, 20 Drawing Sheets

(51) Int. Cl.
*B01D 53/04* (2006.01)
*B01D 53/26* (2006.01)

(52) U.S. Cl.
CPC ........ B01D 53/265 (2013.01); *B01D 53/0438* (2013.01); *B01D 2253/106* (2013.01); *B01D 2257/80* (2013.01); *B01D 2258/06* (2013.01); *B01D 2259/40003* (2013.01); *B01D 2259/4566* (2013.01); *B01D 2259/657* (2013.01); *F24F 2003/1446* (2013.01)

(58) Field of Classification Search
CPC ...... B01D 2259/4566; B01D 2259/657; B01D 53/0438; B01D 53/0446; B01D 53/261; B01D 53/265; F24F 2003/1446; F24F 3/1429

See application file for complete search history.

(56) References Cited

U.S. PATENT DOCUMENTS

| | | |
|---|---|---|
| 6,210,014 B1 | 4/2001 | Kubizne et al. |
| 6,290,758 B1 | 9/2001 | Mowat |
| 6,709,493 B2 | 3/2004 | DeGuiseppi et al. |
| 8,968,063 B2 | 3/2015 | Gifford et al. |
| 2005/0157514 A1 | 7/2005 | Brinkmann |

* cited by examiner

MOISTURE PUMP FOR ENCLOSURE

PRIORITY CLAIM

This patent application claims priority from U.S. Provisional App. No. 62/173,073, entitled "Moisture Reducer for Enclosure," filed Jun. 9, 2015, the disclosure of which are incorporated herein by reference in its entirety.

TECHNICAL FIELD

Generally, the present disclosure relates to moisture reduction in an enclosure. More specifically, this disclosure relates to a moisture pump having a heater for reducing moisture in an enclosure.

BACKGROUND

Many items are susceptible to damage caused by excessive moisture. As used herein, the term "moisture" is intended to refer to water which is diffused or condensed, whether in liquid form or vapor form, from the ambient atmosphere. For instance, electrical and electronic items may be ruined or altered due to excessive moisture. Similarly, enclosed components, e.g., those contained in a housing, that undergo thermal cycling are susceptible to moisture related problems. Examples of enclosures which are susceptible to undesirable moisture include, for example, automotive headlamp units, electronics contained in enclosed housings, and other systems where on/off cycling of a heat source within an enclosure results in moisture build-up. One means of removing moisture from such enclosures is to provide greater airflow across, or through, the enclosure. However, when components are located in an enclosed housing it can be difficult to provide adequate airflow, where more traditional approaches to moisture reduction such as increased vent opening size can exacerbate problems such as enclosure contamination.

Another means of managing moisture in an enclosure is to place a drying agent or desiccant within the enclosure. As the terms "desiccants" or "drying agents" are used herein, they are intended to refer to any material which adsorbs water vapor from the air and is thereby able to reduce the moisture in the air in enclosed containers. However, desiccants have a limited capacity to adsorb moisture and require "regenerating" or removal of adsorbed moisture to continue functioning as a means to remove moisture in the air in an enclosure.

SUMMARY

Some aspects relate to systems, methods, and devices for removing moisture from an environment. For example, some embodiments relate to a moisture pump having a condensation chamber, as well as associated methods of use and manufacture.

Some embodiments relate to an apparatus comprising a housing defining a heating chamber and a condensation chamber; a desiccant positioned in the heating chamber; a heater maintained in the heating chamber and configured to heat the heating chamber; and a valve assembly maintained by the housing. The housing has an adsorption port into the heating chamber, a desorption port between the heating chamber and the condensation chamber, and a venting port out of the condensation chamber. The valve assembly is transitionable between: an adsorption position in which the valve assembly seals the desorption port between the heating chamber and the condensation chamber and opens the adsorption port into the heating chamber for water vapor transmission into the heating chamber, and a desorption position in which the valve assembly seals the adsorption port and opens the desorption port between the heating chamber and the condensation chamber for water vapor transmission out of the heating chamber. In one embodiment, the heater may be positioned outside the condensation chamber. The heater may be positioned in the heating chamber. The apparatus may further comprise a membrane covering the venting port, the membrane being water vapor permeable and water liquid impermeable.

Other embodiments relate to an apparatus, comprising a housing defining a heating chamber and a condensation chamber; a membrane covering the venting port; a desiccant positioned in the heating chamber; a heater maintained in the heating chamber and configured to heat the heating chamber; and a valve assembly maintained by the housing including an adsorption port cover and a desorption port cover. The housing has an adsorption port into the heating chamber, a desorption port between the heating chamber and the condensation chamber, a venting port out of the condensation chamber. The membrane is water vapor permeable and liquid water impermeable. The desorption port cover is positioned in the condensation chamber. The valve assembly is transitionable between an adsorption position in which the valve assembly seals the desorption port between the heating chamber and the condensation chamber with the desorption port cover and opens the adsorption port into the heating chamber for water vapor transmission into the heating chamber, and a desorption position in which the valve assembly seals the adsorption port with the adsorption port cover and opens the desorption port between the heating chamber and the condensation chamber for water vapor transmission out of the heating chamber.

Still other embodiments relate to an apparatus comprising a housing defining a heating chamber and a condensation chamber; a membrane covering the venting port; a desiccant positioned in the heating chamber; a heater maintained in the heating chamber and configured to heat the heating chamber; and a valve assembly maintained by the housing including a port covering frame positioned in the heating chamber. The housing has an adsorption port into the heating chamber, a desorption port between the heating chamber and the condensation chamber, a venting port out of the condensation chamber. The membrane is water vapor permeable and liquid water impermeable. The valve assembly is transitionable between an adsorption position in which the valve assembly seals the desorption port between the heating chamber and the condensation chamber with the port covering frame and opens the adsorption port into the heating chamber for water vapor transmission into the heating chamber, and a desorption position in which the valve assembly seals the adsorption port with the port covering frame and opens the desorption port between the heating chamber and the condensation chamber for water vapor transmission out of the heating chamber.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION

Figure 1:
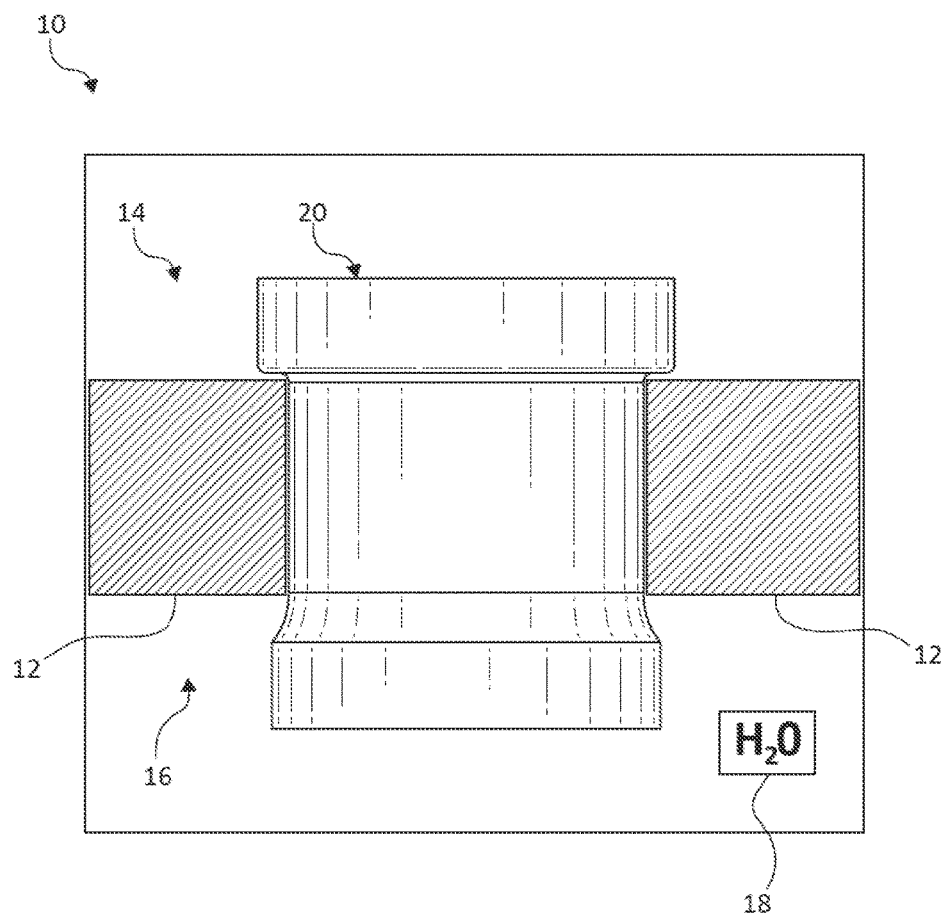
FIG. 1 is a partial elevation view of a system including a moisture pump, according to some embodiments.

FIG. 1 is a partial elevation view of a system 10 including an enclosure housing 12 defining an enclosure and separating an outside environment 14 from an inside environment 16. As used herein, "outside" and "inside" are terms used to describe spaces relative to the enclosure housing 12, which are, for example, on opposite sides of the enclosure housing. As shown in FIG. 1, the system 10 also includes a moisture pump 20 maintained by the enclosure housing 12 and in communication with the outside and inside environments 14, 16.

In some embodiments, a heating source (not shown), such as a light bulb, is positioned in the inside environment 16. The system 10 is used in an automotive application, such as a head lamp, in which the heating source cycles on and off depending on the requirements of the automotive application. Other potential applications for the moisture pump 20 include various electronic enclosures. In one example, an electronic enclosure has electronic components that function as the heating source that is cycled. Whether a headlamp or other heating source, the cycling of the heating source causes moisture 18 (e.g., moisture in the air or water vapor) to buildup in the inside environment 16 of the system 10. The presence of moisture can reduce the useful lifecycle of the heating source or other components, especially electric or electronic components, exposed to the inside environment 16 of the system 10.

As illustrated, the moisture pump 20 is positioned adjacent to the enclosure housing 12 and exposed to the outside environment 14 and inside environment 16. The moisture pump 20 directs moisture 18 out of the inside environment 16 to the outside environment 14. As shown, the moisture pump 20 has a generally cylindrical shape, although a variety of shapes are contemplated.

Figure 1A:
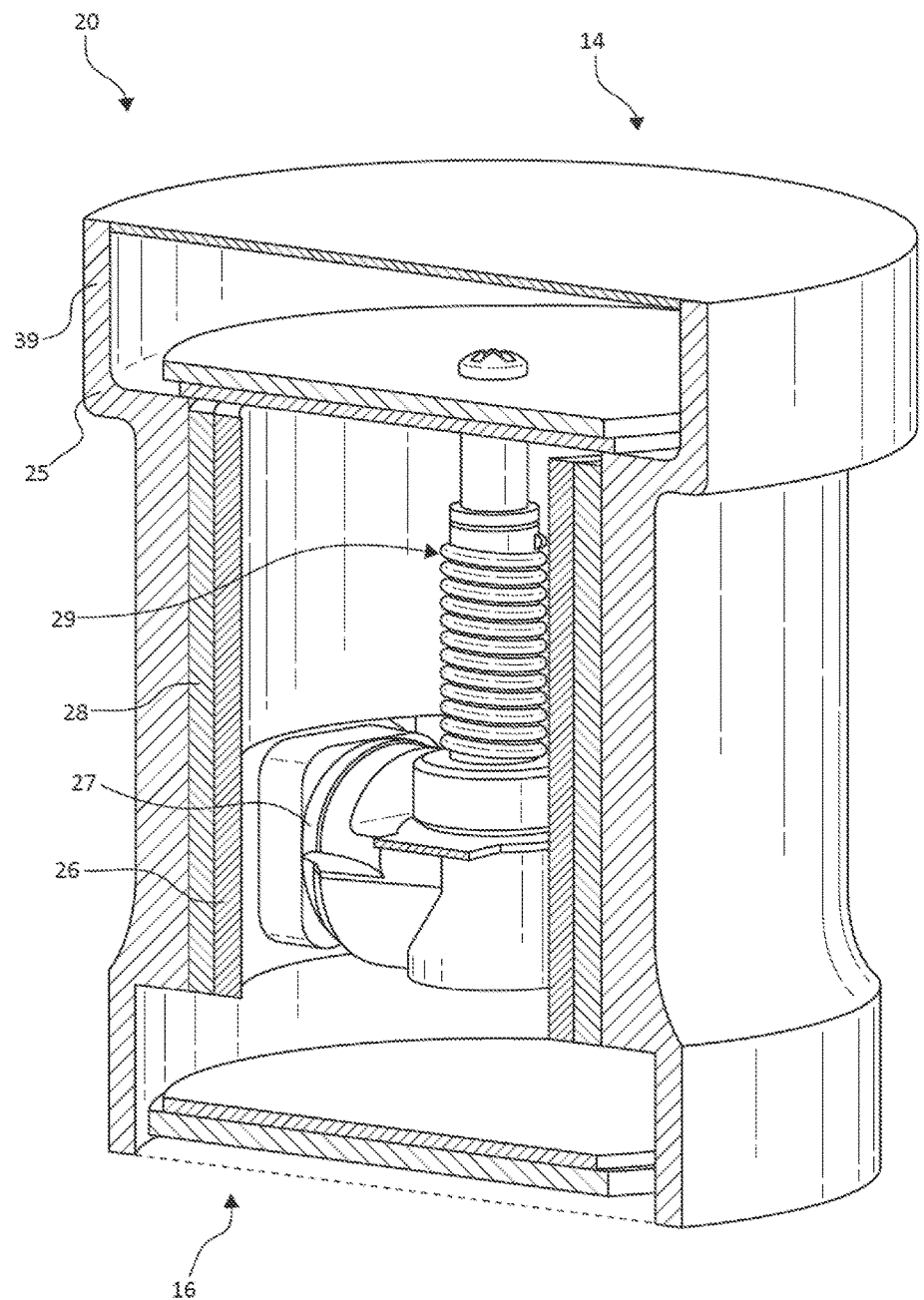
FIG. 1A is a cutaway perspective view of the moisture pump of FIG. 1, according to some embodiments.

FIG. 1A is a cutaway perspective view of the moisture pump 20 according to some embodiments having a pump housing 25 (shown in partial cutaway), a desiccant 26 (shown in partial cutaway), a heater 27, a heat sink 28 (shown in partial cutaway), and a valve assembly 29 (shown in partial cutaway) that is transitionable to selectively allow water vapor transmission into and out of one or more chambers defined by the pump housing 25.

The pump housing 25 optionally forms at least one of an air-tight, a moisture-tight, and a water-tight seal with the enclosure housing 12. In some embodiments, the moisture pump 20 directs moisture 18 from the inside environment 16 into one or more chambers inside the pump housing 25 and directs moisture 18 from the one or more chambers to the outside environment 14. In this manner, the moisture pump 20 facilitates the removal of moisture 18 from the inside environment 16 to extend the useful lifecycle of the heating source or other components exposed to the inside environment 16 of the system 10.

Figure 2:
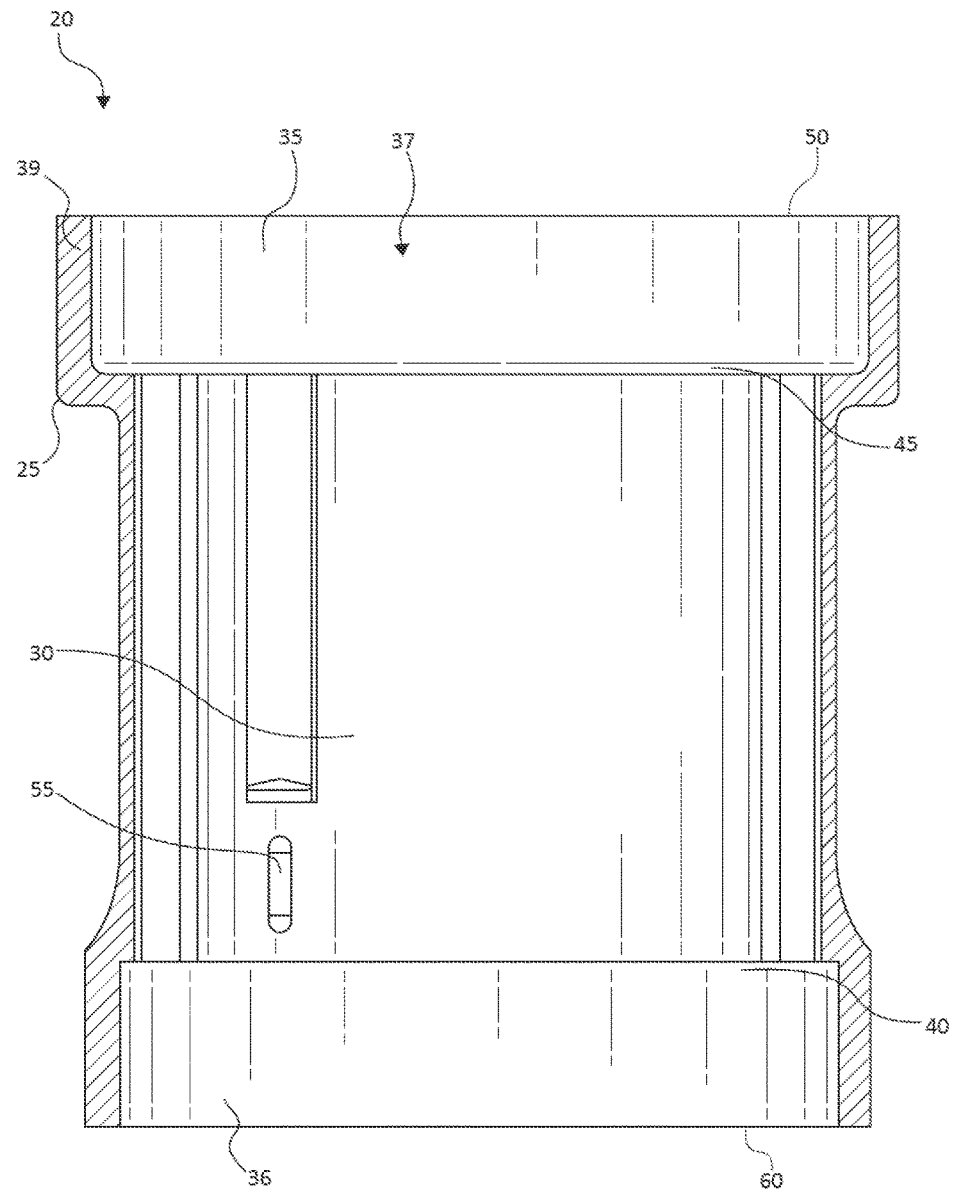
FIG. 2 is a cutaway elevation view of a housing of the moisture pump of FIG. 1, according to some embodiments.

FIG. 2 is a cutaway elevation view of the pump housing 25 of the moisture pump 10, according to some embodiments. As shown, the pump housing 25 is formed of a single piece of material, although separate, connected parts are contemplated. In general terms, the pump housing 25 defines one or more chambers for containing or transmitting moisture. As shown in FIG. 2, the pump housing 25 defines a heating chamber 30, a condensation chamber 35 adjacent to the heating chamber 30, and a debris chamber 36 adjacent to the heating chamber 30. In operation, water vapor is selectively transmitted into the heating chamber 30 (e.g., through the debris chamber 36) and, in turn, from the heating chamber 30 to the condensation chamber 35.

As shown, the pump housing 25 includes a wall 39 forming at least a lateral boundary of the heating, condensation, and debris chambers 30, 35, 36. At the condensation chamber 35, the inner surface of the wall 39 defines a condensation surface that optionally serves as a place for water vapor to collect or precipitate as a liquid, which reduces moisture in the air of the condensation chamber 35.

As shown, the pump housing 25 also has an adsorption port 40, a desorption port 45, and a venting port 50, where the adsorption port 40 provides an area for water vapor transmission into the heating chamber 30 and the desorption port 45 provides an area for water vapor transmission out of the heating chamber 30 into the condensation chamber 35. As shown, the desorption port 45 is positioned between the heating chamber 30 and the condensation chamber 35 and generally corresponds to the area where the pump housing 25 necks down in diameter, although a variety of configurations are contemplated. As will be described in greater detail, the chambers 30, 35, 36 are typically either selectively or continuously separated by valve and/or filter (e.g., membrane) structures.

In some embodiments, the venting port 50 provides an opening for water vapor transmission out of the condensation chamber 35 and to, for example, the outside environment 14 of the system 10 (FIG. 1). In some cases, some or all water vapor enters the condensation chamber 35 and exits the venting port 50 out of the condensation chamber 35. In other cases, some or all of the water vapor enters the condensation chamber 35 and precipitates onto the condensation surface 37 before being transmitted out of the condensation chamber 35. For example, the condensate, liquid water evaporates over time into the air of the condensation chamber 35 and is transmitted through the venting port 50 or is allowed to pass out of a drain portion (not shown), according to some embodiments.

As shown, the debris chamber 36 includes an intake port 60. The intake port 60 communicates with the inside environment 16 of the system 10 (FIG. 1). The intake port 60 generally provides an area for water vapor transmission into the debris chamber 36. As shown, the debris chamber 36 is positioned adjacent to the heating chamber 30. In particular, the adsorption port 40 is positioned between the heating chamber 30 and the debris chamber 36. The debris chamber 36 is also positioned opposite the heating chamber 30 from the condensation chamber 35. In some instances where no debris chamber 36 is present, the adsorption port 40 communicates directly with the inside environment 16 of the system 10 (FIG. 1).

As shown, the pump housing 25 is formed generally in the shape of a cylinder having one or more diameters. The chambers of the pump housing 25 are positioned in juxtaposition, adjacent one another in sequence, along a longitudinal axis. The pump housing 25 optionally includes one or more openings 55 for housing an electrical conductor (not shown). The electrical conductor allows for the delivery of electrical power to the interior of pump housing 25, such as to heating chamber 30.

Figure 3:
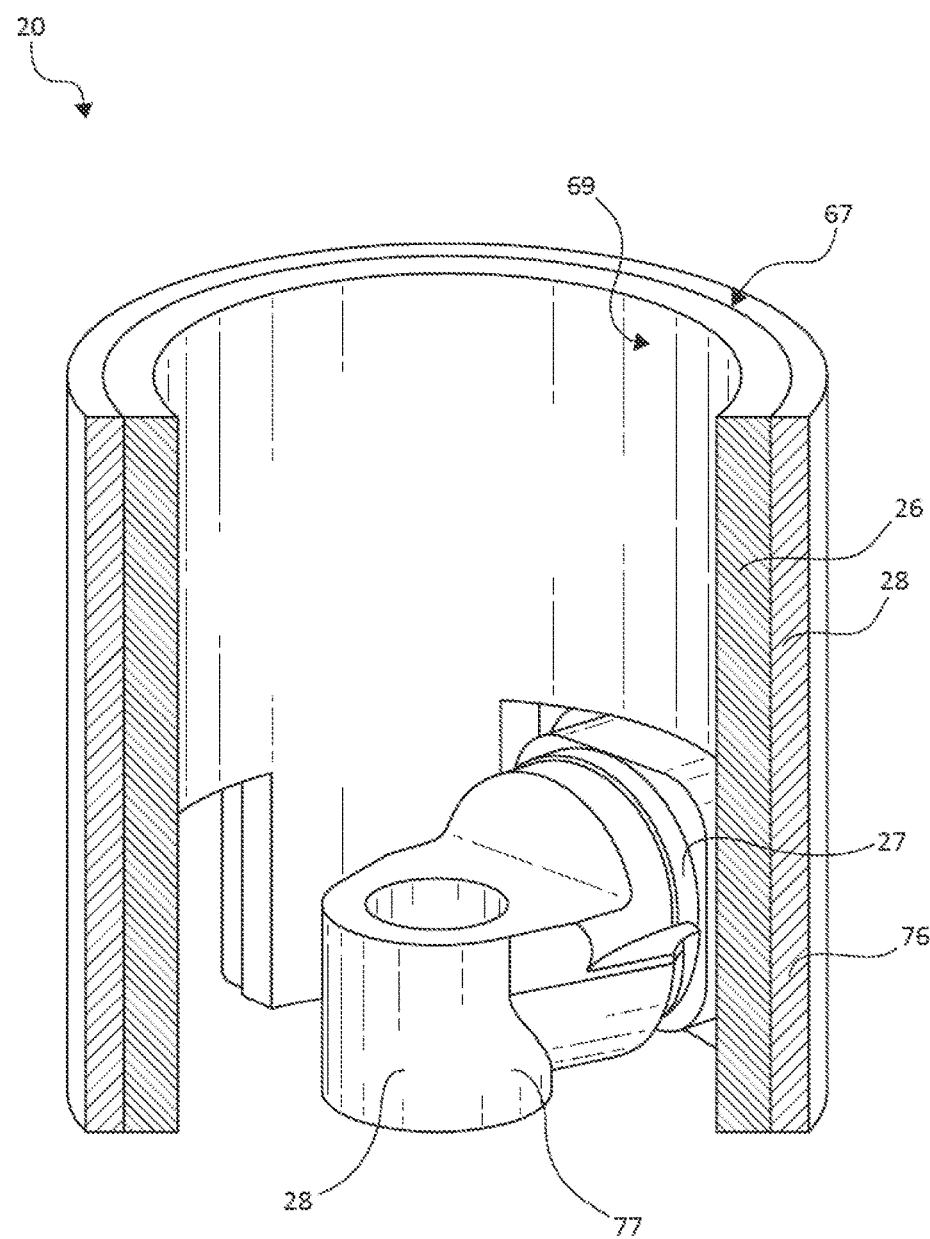
FIG. 3 is a cutaway perspective view of a desiccant, a heater, and a heat sink of the moisture pump of FIG. 1, according to some embodiments.

As shown in FIG. 3, the moisture pump 20 according to some embodiments includes a desiccant 26 (shown in partial cutaway), a heater 27, and a heat sink 28 (shown in partial cutaway). The moisture pump 20 generally operates to remove moisture from air entering the moisture pump 20 and return the moisture to air exiting the moisture pump 20. The desiccant 26 is configured to adsorb water vapor from the air, generally, when not heated. Non-limiting examples of desiccant forms include but are not limited to: beads glued onto a scrim, a solid tablet (e.g., having an adsorbent plus binder), cloth (e.g., knit, woven, or non-woven), and a desiccant material plus polytetrafluoroethylene (PTFE) (e.g., silica gel filled PTFE). As shown, desiccant 26 includes an outer surface 67 and an inner surface 69. Although not limited to any particular shape, the desiccant 26 is shown formed in a cylindrical shape.

In the illustrated embodiment, the heater 27 directs heat to the heat sink 28 for heating the desiccant 26. The heater 27 is optionally powered through an electrical conductor operatively coupled thereto, which is positioned through one or more openings of the pump housing 25. A non-limiting example of a heater 27 is a positive thermal coefficient (PTC) heater. In some embodiments, the PTC heater is self-regulating. As illustrated, the heat sink 28 is positioned adjacent to the heater 27 to receive heat generated by the heater. As shown, the heat sink 28 is in conductive contact with the heater 27 to be thermally coupled therewith although other heat transmission modes (e.g., radiant) are acceptable. The heater 27 may also be secured to the heat sink 28. In some embodiments, the heat sink 28 includes two portions, a generally cylindrical portion 76 and an internal portion 77. As shown, the heater 27 is positioned between the generally cylindrical portion 76 and the internal portion 77 of the heat sink 28. In some embodiments, the heat sink 28 is also positioned adjacent to the desiccant 26. For example, as illustrated, the generally cylindrical portion of the heat sink 28 is in conductive contact with the desiccant 26. In particular, the outer surface 67 of the desiccant 26 is in contact with the generally cylindrical portion of the heat sink 28. The desiccant 26 may also be secured to the heat sink 28 by adhesive or glue, for example.

In operation, the heater 27 is selectively powered to generate heat. Though a portion of the heat may be dissipated through the air (e.g., via convection) or other components, generally a significant portion of generated heat is absorbed into the heat sink 28. At least a portion of the heat in the heat sink 28 is absorbed (e.g., via conduction) into the desiccant 26. Water vapor adsorbed in the desiccant 26 is heated and released from the desiccant 26 into air in the heating chamber 30, for example. When the heater 27 is not powered, and the desiccant 26 is sufficiently cooled, the desiccant 26 adsorbs water vapor in the air.

Figure 4:
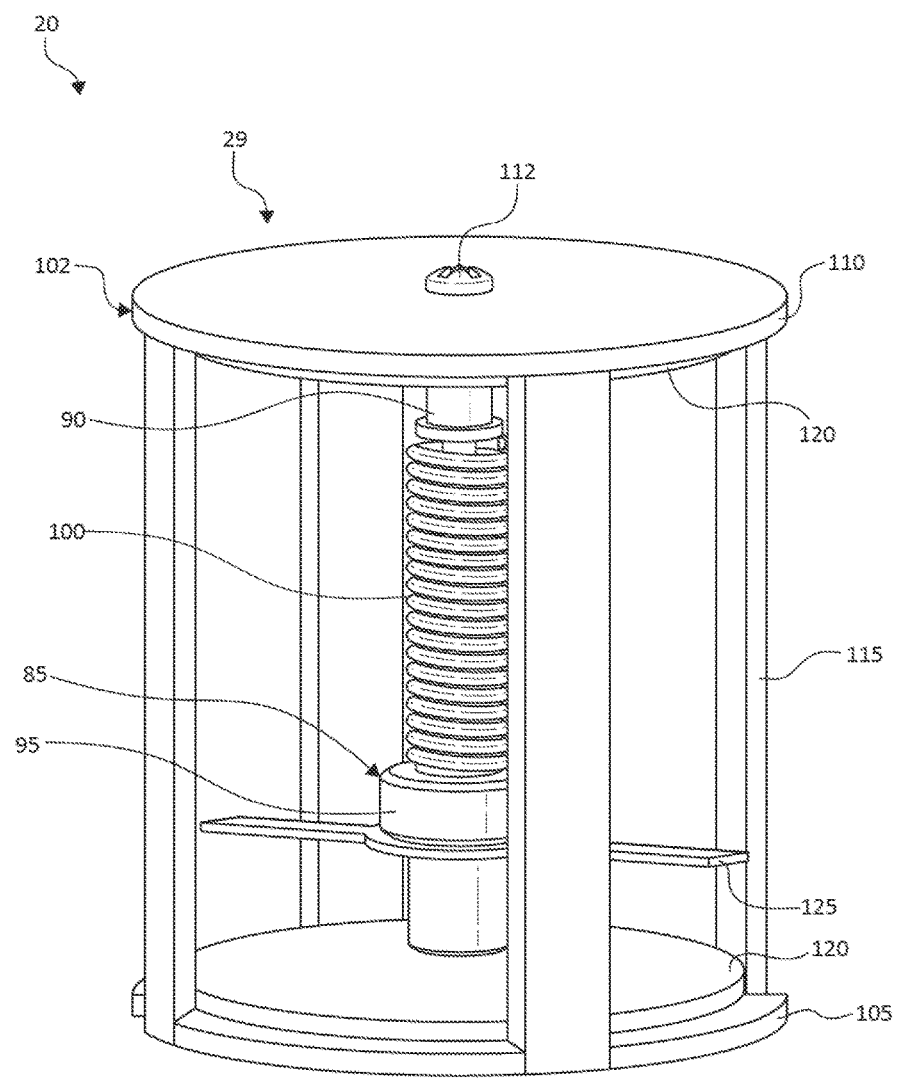
FIG. 4 is a perspective view of a valve assembly of the moisture pump of FIG. 1, according to some embodiments.

FIG. 4 shows additional features of the moisture pump 20, including a valve assembly 29 of the moisture pump 20, according to some embodiments. The valve assembly 29 is transitionable to selectively allow water vapor transmission into and out of the one or more chambers defined by the pump housing 25. As shown, the valve assembly 29 has a poppet valve-type shape.

The valve assembly 29 includes an actuator 85 configured to transition the valve assembly 29 relative to the housing between a first position and a second position. The actuator 85 includes a piston 90 and a drive 95 for translating the piston between the first and second positions.

In various embodiments, the actuator 85 is a thermomechanical actuator responsive to temperature. In some embodiments, the drive 95 of the actuator 85 includes a phase change material, such that the drive 95 is a phase change drive. As used herein, a phase change material expands or contracts in response to temperature such that, for example, the phase change material expands in response to being heated and contracts in response to cooling down. Non-limiting examples of phase change materials include wax (e.g., paraffin wax), bimetal elements, and Nitinol. The actuator 85 drives the piston 90 in at least one direction, for example, pushing the piston 90 in a first direction to the second position upon expansion of the phase change material and then allowing the piston 90 to return to the first position upon contraction of the phase change material with cooling.

As also shown, the valve assembly 29 includes a spring 100. In some embodiments, the spring 100 biases the valve assembly 29 (e.g., in a second direction opposite the first direction in which the drive 95 pushes the piston 90). As illustrated, the spring 100 is in contact with and acts on the piston 90 and the drive 95. The spring 100 cooperates with the actuator 85 to position the valve assembly 29. In various embodiments, the spring 100 and the actuator 85 cooperate to actuate the valve assembly 29 in response to particular heating or cooling of the actuator caused by the heater. For example, the spring 100 biases the actuator 85 to contract at a lower temperature than if the spring 100 was not present, or vice versa.

Valve assembly 29 is also shown including a port covering frame 102. The port covering frame 102 is coupled to the actuator 85 to transition in response to movement of the actuator 85. The port covering frame 102 includes an adsorption port cover 105, a desorption port cover 110, a fastener 112, a linkage 115, and a gasket 120. As shown, the desorption port cover 110 is coupled to the piston 90 of the actuator 85 by a fastener 112. The desorption port cover 110 is coupled to the linkage 115. As shown, the linkage 115 includes four posts. The adsorption port cover 105 is coupled to the linkage 115, such that the desorption port cover is operatively coupled to the piston 90.

As illustrated, both of the adsorption port cover 105 and desorption port cover 110 include a gasket 120, or other means, to facilitate sealing against the housing. The gasket 120 is made of elastic elastomer or any other suitable material for sealing a port with a cover. In some embodiments, the gasket 120 is included on at least one of the port covers 105, 110.

Some embodiments of the valve assembly 29 also include a bridge 125. The bridge 125 maintains the position of the actuator 85, in particular the drive 95, with respect to the housing. The bridge 125 may be secured to the drive 95 of the actuator 85.

Figure 5:
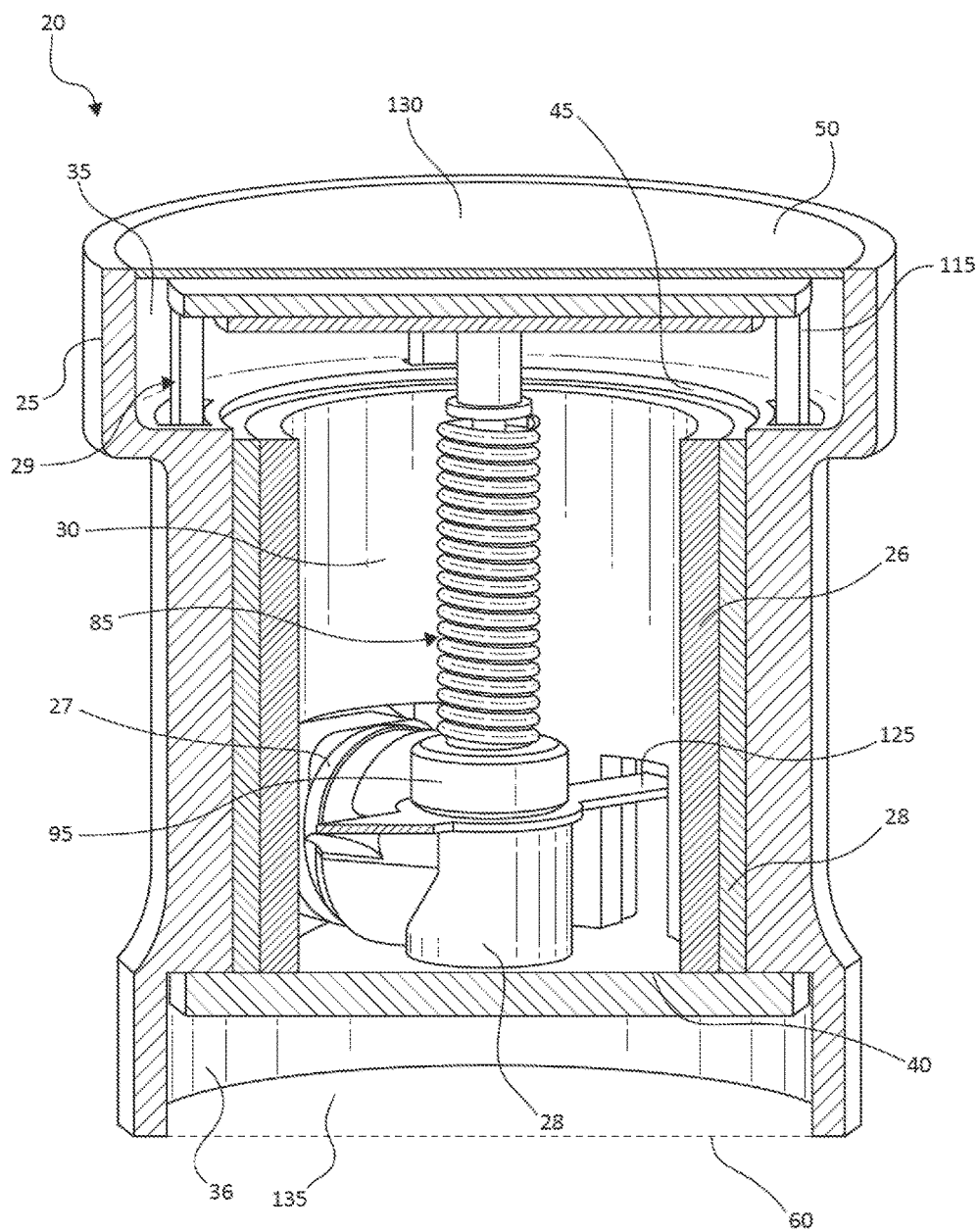
FIG. 5 is a cutaway perspective view of the assembled moisture pump of FIG. 1, according to some embodiments.

FIG. 5 is a cutaway perspective view of the assembled moisture pump 20, according to some embodiments. The desiccant 26, heater 27, heat sink 28, and valve assembly 29 are maintained directly or indirectly by the pump housing 25. The valve assembly 29 transitions to selectively cover either the adsorption port 40 or the desorption port 45, one at a time. Covering and sealing the ports 40, 45 respectively inhibits the transmission of water vapor into and out of the moisture pump 20. As shown, portions of the valve assembly 29 are positioned in the heating chamber 30, the condensation chamber 35, and the debris chamber 36. In particular, the adsorption port cover 105 is positioned in the debris chamber 36 and the desorption port cover 110 is positioned in the condensation chamber 35.

The bridge 125 is coupled to at least one of the pump housing 25, the desiccant 26, and the heat sink 28 to secure the drive 95 of the actuator 85 to the pump housing 25. The desiccant 26 and heat sink 28 are shown including one or more slots to accommodate installation with the presence of the bridge 125.

The desiccant 26, heater 27, and heat sink 28 are shown positioned in or maintained in the heating chamber 30. The heater 27 is positioned outside of the condensation chamber 35. The desiccant 26 is exposed to the moisture in the air of heating chamber 30. The generally cylindrical portion of the heat sink 28 is also optionally secured to the pump housing 25 to prevent movement of the desiccant 26, heater 27, and heat sink 28 relative to the pump housing 25. In other embodiments (not shown), one or more of the desiccant 26, heater 27, and heat sink 28 are partially positioned in the heating chamber 30. In yet other embodiments (not shown), the heater 27 is positioned outside of the heating chamber 30 and the heat sink 28 is position in or partially positioned in the heating chamber 30.

The drive 95 of the actuator 85 is positioned in the heating chamber 30. A portion of the drive 95 is also positioned in the internal portion of the heat sink 28 and is optionally secured therein.

During operation, and according to some embodiments, when the heater 27 delivers heat to the heating chamber 30, the actuator 85 and the desiccant 26 are heated through heat sink 28. In response, the actuator 85 expands, and the desiccant 26 desorbs moisture to the heating chamber 30. When the heater 27 does not deliver heat to the heating chamber 30, actuator 85 and the desiccant 26 cool down. In response, the actuator 85 contracts, and the desiccant 26 adsorbs water vapor in the air of the heating chamber 30.

In the shown embodiment, the linkage 115 is partially positioned in one or more lumens formed in the pump housing 25 adjacent to the heating chamber 30. The one or more lumens facilitate transitioning of the valve assembly 29 relative to the pump housing 25.

Various embodiments of the moisture pump 20 include one or more membranes configured for one or more purposes. One purpose of the one or more membranes is to prevent solid debris from entering or leaving the moisture pump 20, such as preventing desiccant particles freed from or dusted off the desiccant 26 from leaving the pump housing 25 of the moisture pump 20 and entering the inside environment 16 (FIG. 1) or preventing particles (e.g., dust) from entering from the outside or inside environment 14, 16 (FIG. 1) into the moisture pump. Another purpose of the one or more membranes is to allow air and water vapor to be transmitted therethrough. Yet another purpose of the one or more membranes is to prevent liquid water from being transmitted therethrough. Still another purpose of the one or more membranes is to discourage oils from building up on the membrane. In some embodiments, the one or more membranes are solid debris impermeable, air permeable, vapor permeable (e.g., water vapor permeable), water impermeable, and oleophobic in response to the one or more purposes selected. As illustrated, membrane 130 covers the venting port 50. Also, as illustrated, the membrane 135 covers the intake port 60 and is positioned between the pump housing 25 and an inside environment 16 (FIG. 1) to prevent particles freed from the desiccant 26 from entering the inside environment. In some embodiments, the membrane 130 is adhered to the pump housing 25. Examples of suitable membrane materials include ePTFE membranes, such as those described in U.S. Pat. Nos. 6,210,014, 6,709,493, and 8,968,063, the contents of which are incorporated herein by reference for all purposes.

Figure 6:
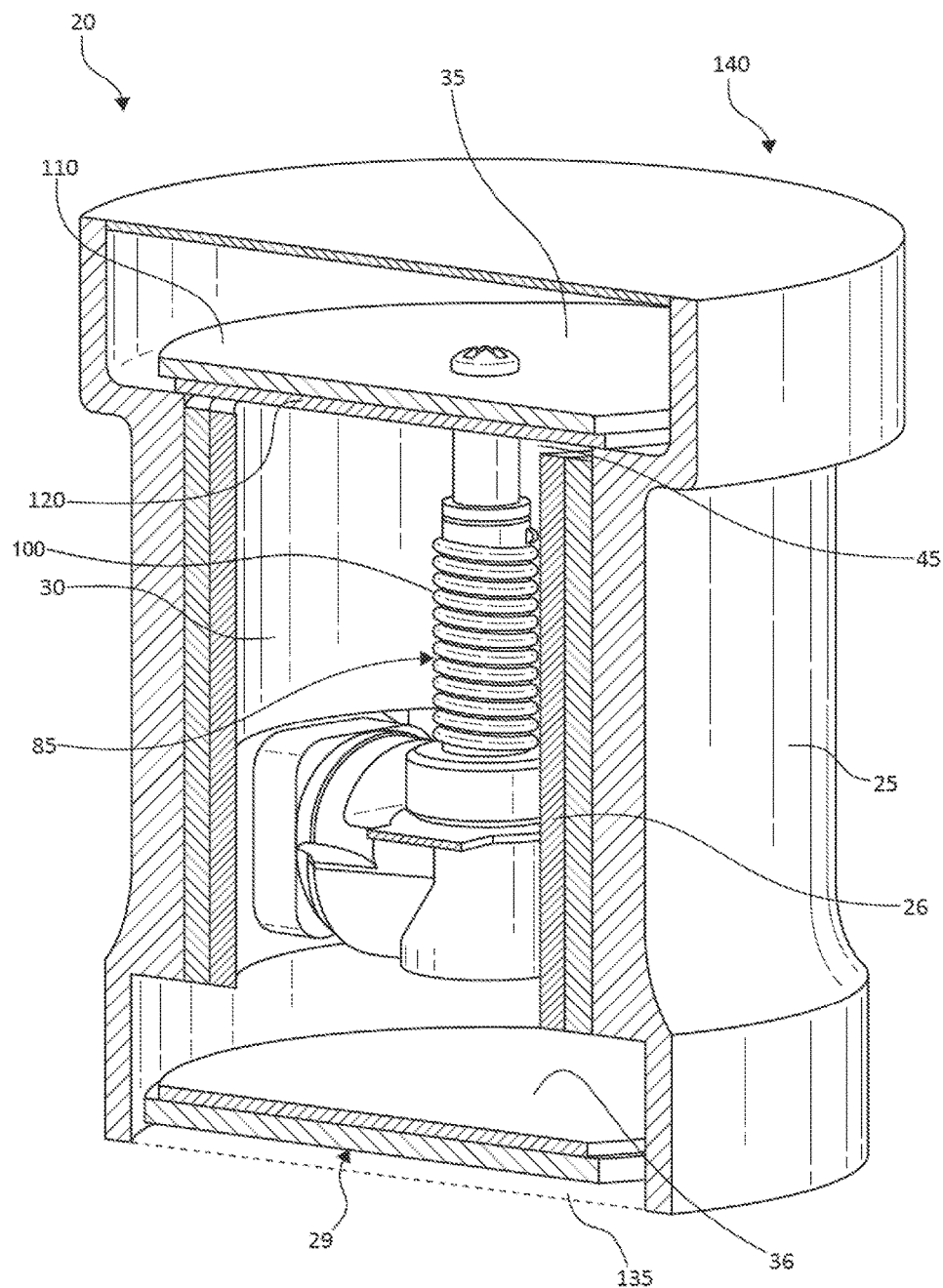
FIGS. 6 & 7 are cutaway perspective views of the assembled moisture pump of FIG. 1 showing an adsorption position and a desorption position, respectively, according to some embodiments.
Figure 7:
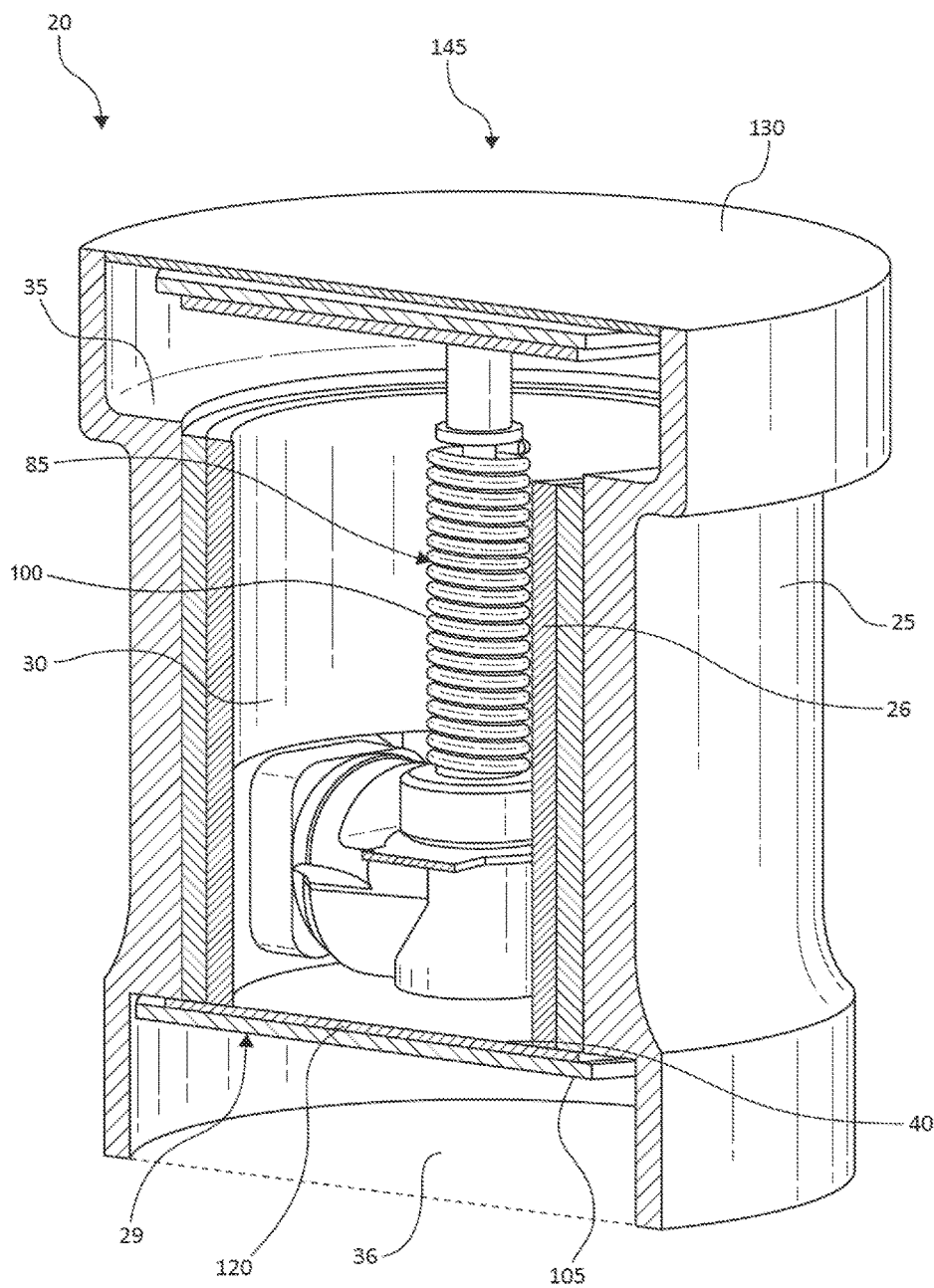

FIGS. 6 and 7 are cutaway perspective views of the assembled moisture pump 20 in an adsorption position and a desorption position, respectively, according to some embodiments. According to some embodiments, in either position, air including water vapor is free to be transmitted through the membrane 135 into the debris chamber 36.

As shown in FIG. 6, in the adsorption position 140, the actuator 85 and the spring 100 are contracted, or in a retracted position, such that water vapor can be delivered to the desiccant 26. In some embodiments, the actuator 85 is placed in the retracted position (e.g., after the cooling that follows shutting off the heater 27) after the desiccant 26 has been dried, or regenerated, following a heating cycle of the heater 27 such that the desiccant 26 is primed to adsorb water vapor. In transitioning to the adsorption position 140, the valve assembly 29 opens the adsorption port 40 and seals the desorption port 45. In particular, the desorption port cover 110 including a gasket 120 contacts the pump housing 25 to seal the desorption port 45. According to some embodiments, during an adsorption cycle, the valve assembly 29 is in the adsorption position 140 and no heat is delivered by the heater 27 to the heating chamber 30 to the actuator 85 or the desiccant 26.

In the adsorption position (FIG. 6), water vapor is free to be transmitted from the debris chamber 36 into the heating chamber 30 for adsorption by the desiccant 26. However, water vapor generally cannot be transmitted between the heating chamber 30 and the condensation chamber 35 due to the seal of the desorption port cover 110 as shown.

In the desorption position (FIG. 7), the actuator 85 and the spring 100 are expanded, or in an extended position. In transitioning to the desorption position, the valve assembly 29 seals the adsorption port 40 and opens the desorption port 45. In particular, the adsorption port cover 105 including a gasket 120 contacts the pump housing 25 to seal the adsorption port 40. During and/or for a desired period of time following a heating cycle, the valve assembly 29 is in the desorption position 145 and heat is delivered to the heating chamber 30, particularly to the actuator 85 and the desiccant 26. In response to the heat delivered by the heater 27, the actuator 85 expands and the desiccant 26 begins to release moisture into the air. As shown, in either the desorption or adsorption positions the heater 27 remains in a fixed position relative to the pump housing 25 outside of the condensation chamber 35 of the pump housing 25.

Water vapor is free to be transmitted from the heating chamber 30 into the condensation chamber 35, for example, by diffusion. However, according to the operation illustrated in FIGS. 6 and 7, water vapor generally cannot be transmitted into the debris chamber 36 due to the seal of the adsorption port cover 110 when the moisture pump 20 is in the desorption position. Accordingly, water vapor from the heating chamber 30 also generally cannot be transmitted out of the membrane 135. Heated water vapor in the condensation chamber 35 vents through membrane 130 or begins to condense on one or more surfaces in the condensation chamber.

In one embodiment, the moisture pump 20 having the condensation chamber 35 increases the moisture desorption from the desiccant 26 by greater than about 10% over 300 minutes at 22 degrees Celsius and 50% relative humidity, e.g., by greater than about 20% or by greater than about 30%. In some embodiments, the moisture pump 20 having the condensation chamber 35 increases the moisture desorption from the desiccant 26 by about 60% over 300 minutes at 22 degrees Celsius and 50% relative humidity. This may allow the desiccant 26 to remove more moisture from the enclosure.

Various embodiments of the disclosure facilitate appropriate timing between the valve assembly positions 140, 145 and the heating of the desiccant 26 to eject moisture from the desiccant. Non-limiting examples of configurations, presented in the alternative or in combination, that facilitate appropriate timing include: setting the wax melting temperature of the actuator 85 lower than the desorption temperature of the desiccant 26, locating the heater closer to the actuator 85 and relatively further from the desiccant 26 on the heat sink, setting the cross sectional area of the heat sink to favor more transient heat flux to the actuator 85 than to the desiccant 26, and selecting material properties of the heat sink to favor a high heat transfer rate to the actuator 85 before the desiccant 26. Additionally, in some embodiments a microcontroller is optionally utilized to directly control heater temperature and duration and/or operation of an electronic (e.g., solenoid) rather than phase change actuator (not shown).

In some instances, after a selected amount of time, heat is no longer delivered to the heating chamber 30, and the valve assembly 29 seals the desorption port 45 to begin an evaporation cycle. The liquid water in the condensation chamber 35 is free to continue evaporation and water vapor remaining in the condensation chamber is free to continue transmission out of the condensation chamber over a period of time while the moisture pump 20 remains in the adsorption position 140. Due to the seal of the desorption port 45, this moisture generally cannot re-enter the heating chamber 30. The desiccant 26 is free to begin adsorbing moisture entering the heating chamber 30 through adsorption port 40. A person having skill in the art and the benefit of this disclosure would be able to select an appropriate time for heating, desorption, and adsorption in view of a particular application and moisture pump characteristics.

Figure 8:
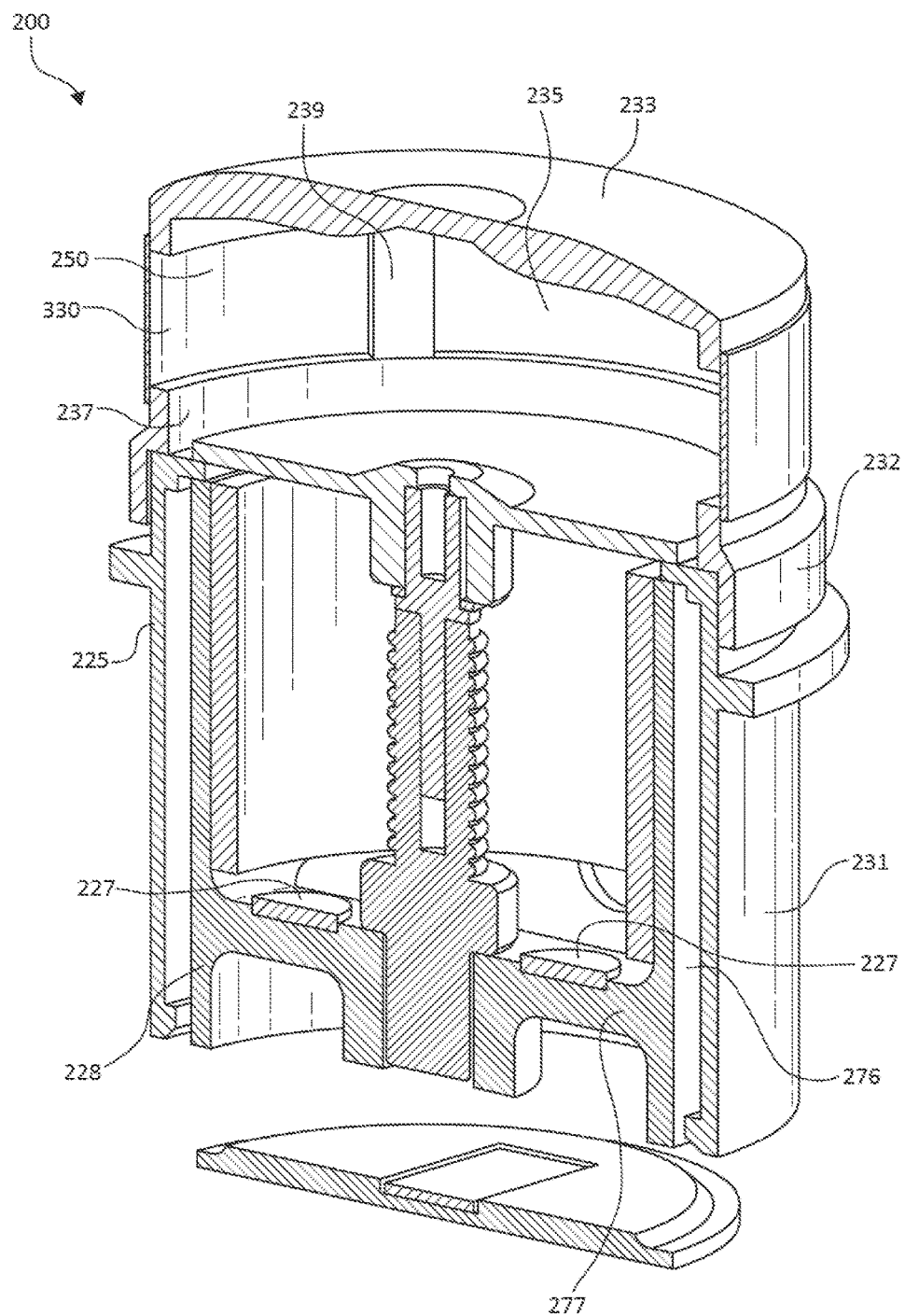
FIG. 8 is a cutaway perspective view of another assembled moisture pump, according to some embodiments.
Figure 9:
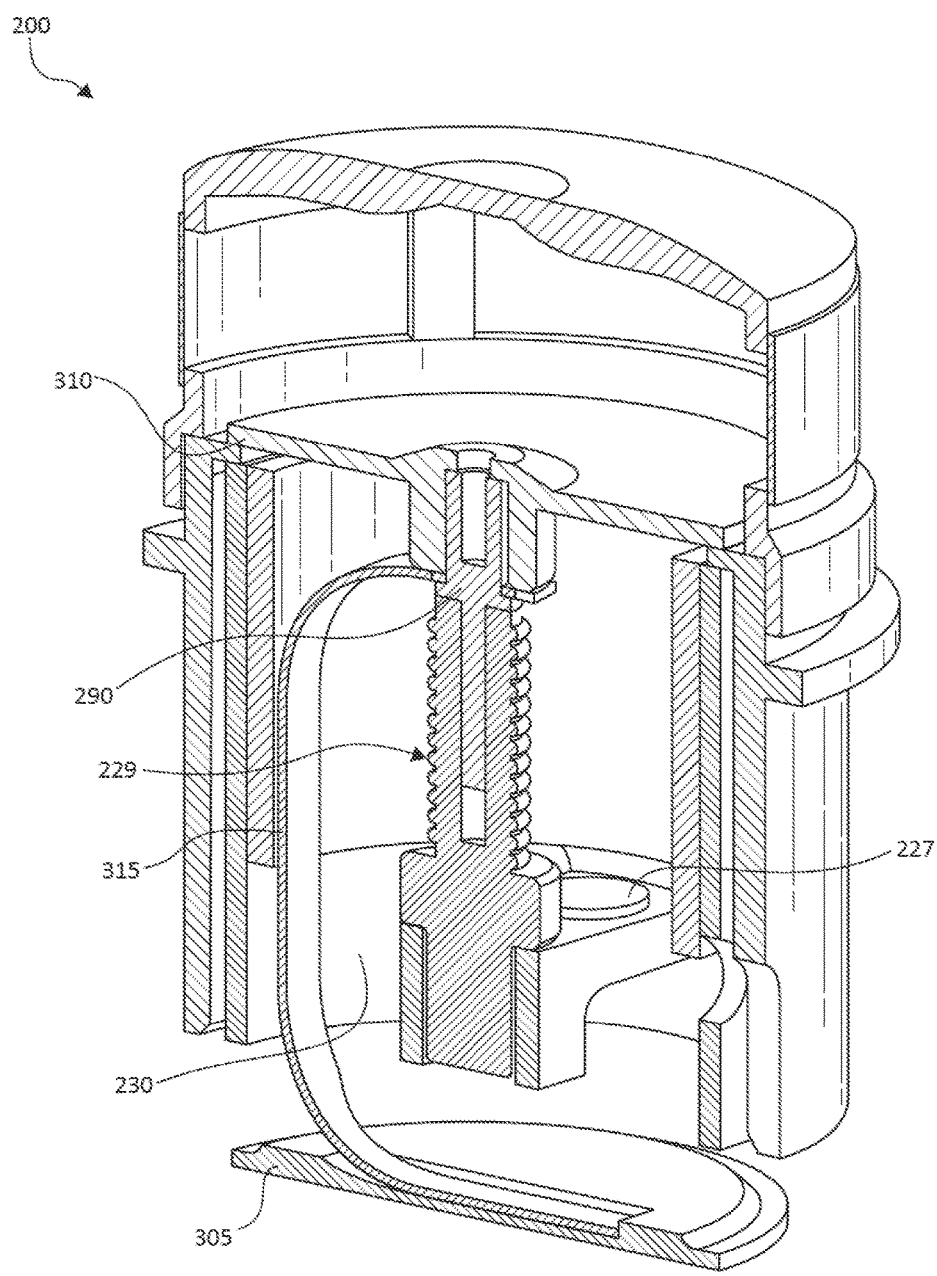
FIG. 9 is another cutaway perspective view of the assembled moisture pump of FIG. 8, according to some embodiments.
Figure 10:
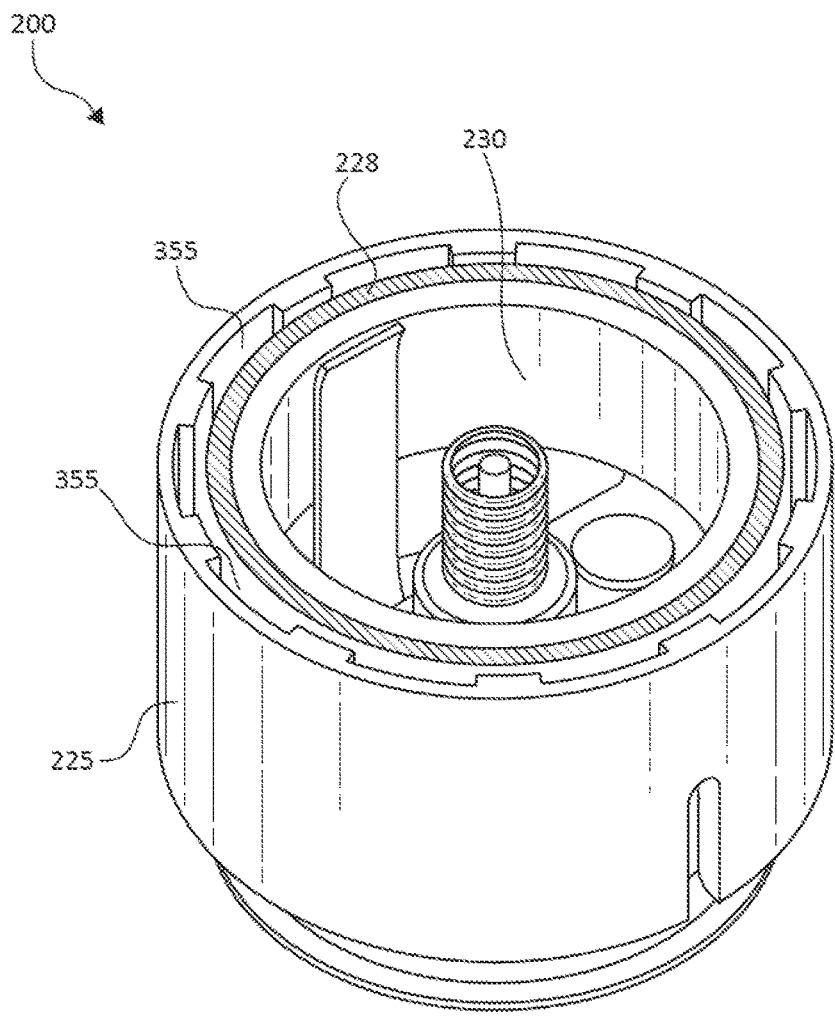
FIG. 10 is yet another cutaway perspective view of the assembled moisture pump of FIG. 8, according to some embodiments.

FIGS. 8-10 are cutaway perspective views of another assembled moisture pump 200, according to some embodiments of the disclosure. FIG. 9 shows the moisture pump 200 along a cross section similar to FIG. 8 (e.g., along an X-Z plane) but is rotated 90 degrees (e.g., along a Y-Z plane). FIG. 10 shows the moisture pump 200 along a cross section perpendicular to the cross sections shown in FIGS. 8-9 (e.g., along an X-Y plane). The moisture pump 200 is optionally similar to moisture pump 20 and optionally includes various components similar to the moisture pump 20, which are left from discussion to avoid unnecessary repetition. Various additional or alternative features of moisture pump 200 are discussed herein with respect to FIGS. 8-10. In some embodiments, moisture pump 200 is used in operation in a similar manner to moisture pump 20, including being able to transition between an adsorption position and a desorption position.

As shown in FIG. 8, moisture pump 200 includes a pump housing 225 that is modular and includes a heating body 231 and a condensation body 232. The condensation body 232 includes a condensation cap portion 233, according to some embodiments. The pump housing 225 as shown does not define a debris chamber, although use of such a feature similar to pump 20 is contemplated. As shown, example condensation body 232 is coupled to the heating body 231. The heating body 231 of the pump housing 225 generally defines the heating chamber 230. The condensation body 232 of the pump housing 225 generally defines the condensation chamber 235. When not present, the condensation body 232 optionally provides an opening for components to be inserted into the pump housing 225 during assembly.

Also, the wall 239 of the pump housing 225 includes venting port 250 positioned in the wall 239 of the pump housing 225. As shown, venting port 250 includes one or more openings formed in the wall 239 of the pump housing 225. The venting port 250 is covered by membrane 330. In some embodiments, membrane 330 is similar to membrane 130.

In some embodiments, the condensation chamber 235 also includes a condensation surface 237. For example, the condensation surface 237 is optionally defined by the pump housing 225 exposed to the condensation chamber, which may include the interior surface of the condensation body 232. As shown, the condensation surface 237 is defined by the wall 239 of the pump housing 225 and is also defined by the interior of the condensation cap portion 233 of the condensation body 232.

Also, as illustrated, heater 227 comprises two heating elements in contact with heat sink 228. Each of the heating elements of the heater 227 is positioned outside of the condensation chamber 235. The heat sink 228 includes a generally cylindrical portion 276 and an internal portion 277 extending across the internal diameter of the generally cylindrical portion. As shown, moisture pump 200 does not include a bridge, although the use of such feature is contemplated. The heat sink 228 may be secured to the pump housing 225.

As illustrated in FIG. 9, the valve assembly 229 includes linkage 315 coupled to the piston 290 and coupled to the adsorption port cover 305. The desorption port cover 310 is coupled to the piston 290 by a fastener (not shown), for example. In contrast to linkage 115, linkage 315 is not positioned in one or more lumens formed in the pump housing 225, but rather, linkage 315 is partially positioned in the heating chamber 230. In other embodiments, the linkage 315 is positioned in the heating chamber 230, similar to linkage 115, for example. As shown, the desorption port cover 310 is positioned in the condensation chamber 235.

As shown in FIG. 10, moisture pump 200 includes an insulator 355 to insulate the heating chamber 230. The insulator 355 is configured to reduce the transfer of heat out of the heating chamber 230. In some embodiments, the insulator 355 is formed of an insulating material (e.g., insulating foam) or is configured as a bounded air gap, for example.

As shown, the insulator 355 is positioned in the pump housing 225 adjacent to the heating chamber 230. The insulator 355 is positioned between the pump housing 225 and the heat sink 228. In some embodiments, the insulator 355 does not provide significant insulation to the condensation chamber 235. In other words, the pump 200 is configured to retain heat in the heating chamber 230 keeps while allowing the condensation chamber 235 to stay relatively cooler than the heating chamber 230 to encourage cooling of the water vapor and thus condensation.

In various embodiments (not shown), an insulator is also positioned between the condensation chamber 235 and the heating chamber 230 to help prevent or reduce heat transfer into the condensation chamber 235 from the heater and heating chamber 230. For example, an insulator similar to the insulator 355 is additionally or alternatively positioned in the desorption port cover 310. In another example, a passage is optionally formed between the heating chamber and the condensation chamber in fluid communication with the desorption port. Adjacent to the passage, an optional space between the heating chamber 230 and the condensation chamber 235 is defined for positioning the insulator 355 therein.

Figure 11:
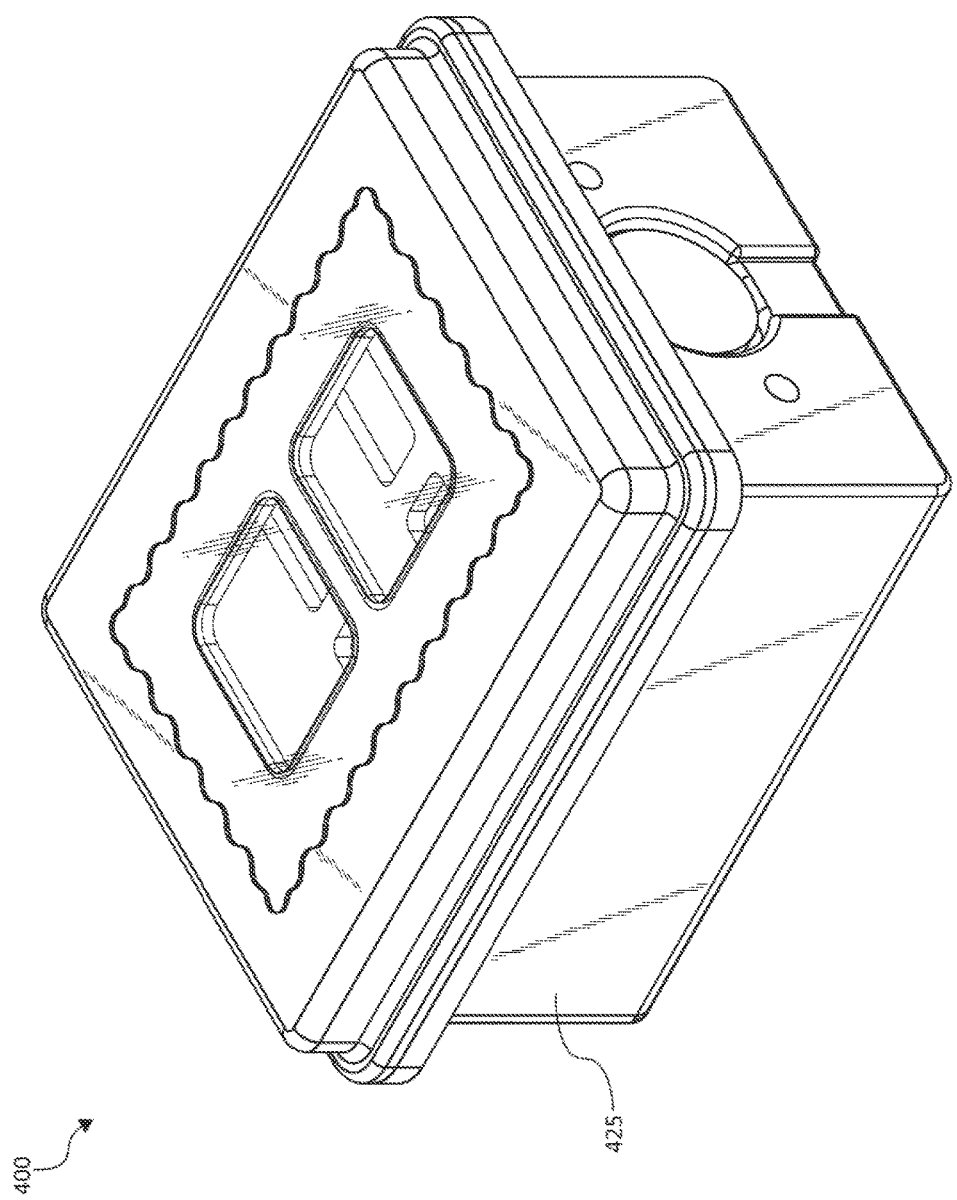
FIG. 11 is a perspective view of yet another moisture pump, according to some embodiments.

FIG. 11 is a perspective view of yet another moisture pump 400, according to some embodiments. Similar to other embodiments, in use, moisture pump 400 helps remove moisture from an inside environment and transmit it to an outside environment. The moisture pump 400 is optionally similar to either moisture pump 20, 200 and optionally includes various components similar to either moisture pump 20, 200, which are left from discussion to avoid unnecessary repetition. Various additional or alternative features of moisture pump 400 are discussed herein with respect to FIGS. 11-17. In some embodiments, moisture pump 400 is used in operation in a similar manner to either moisture pump 20, 200, including being able to transition between an adsorption position and a desorption position.

Instead of the generally cylindrical shape of the other moisture pumps 20, 200, moisture pump 400 has a generally rectangular cuboid shape or matchbox shape, although other shapes are contemplated. Moisture pump 400 includes pump housing 425 that defines one or more chambers.

Figure 12:
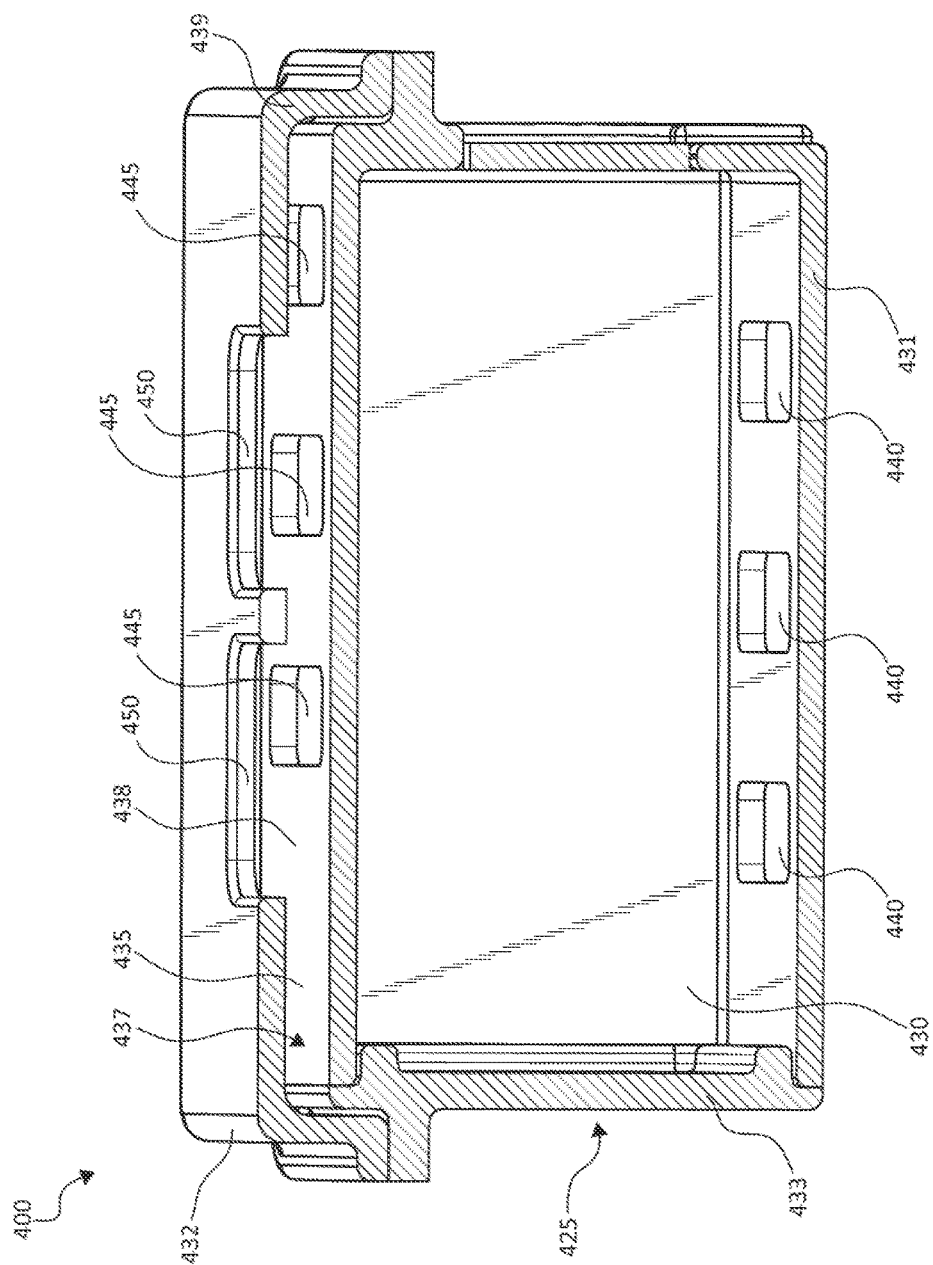
FIG. 12 is a cutaway perspective view of a housing of the moisture pump of FIG. 11, according to some embodiments.

FIG. 12 is a cutaway perspective view of the pump housing 425 of the moisture pump 400, according to some embodiments. As illustrated, the pump housing 425 is modular and includes a heating body 431, a condensation body 432, and a heating end cap 433. The pump housing 425 defines a heating chamber 430 and a condensation chamber 435. As shown, the heating end cap 433 is disposed opposite an opening in the pump housing 425, in particular the heating body 431, for receiving a heater. By being a separate piece, the heating end cap 433 helps to provide an opening for components to be inserted into the pump housing 425 during assembly.

In some embodiments, the condensation chamber 435 includes a condensation surface 437 exposed to the condensation chamber. For example, the condensation surface 437 is optionally defined by the pump housing 425 exposed to the condensation chamber, which may include the wall 439 of the housing. As shown, the condensation surface 437 includes the interior surface of the condensation body 432, the exterior surface 438 of the heating body 431 exposed to the condensation chamber 435, and the interior surface of the wall 439 of the housing.

In various embodiments, the pump housing 425 also includes an adsorption port 440, a desorption port 445, and a venting port 450. As shown, the adsorption port 440 includes one or more openings formed in the pump housing 425, such as the heating body 431 of the housing. As illustrated, the desorption port 445 includes one or more openings formed in the pump housing 425, such as the heating body 431 of the housing. Also as illustrated, the venting port 450 includes one or more openings formed in the pump housing 425, such as the condensation body 432 of the housing.

In the embodiment shown, the adsorption port 440 is adjacent to the heating chamber 430 on the opposite side of the desorption port 445, which is also adjacent to the heating chamber. Further as shown, the venting port 450 is adjacent to the condensation chamber 435 on the opposite side of the desorption port 445, which is also adjacent to the condensation chamber 435.

Figure 13:
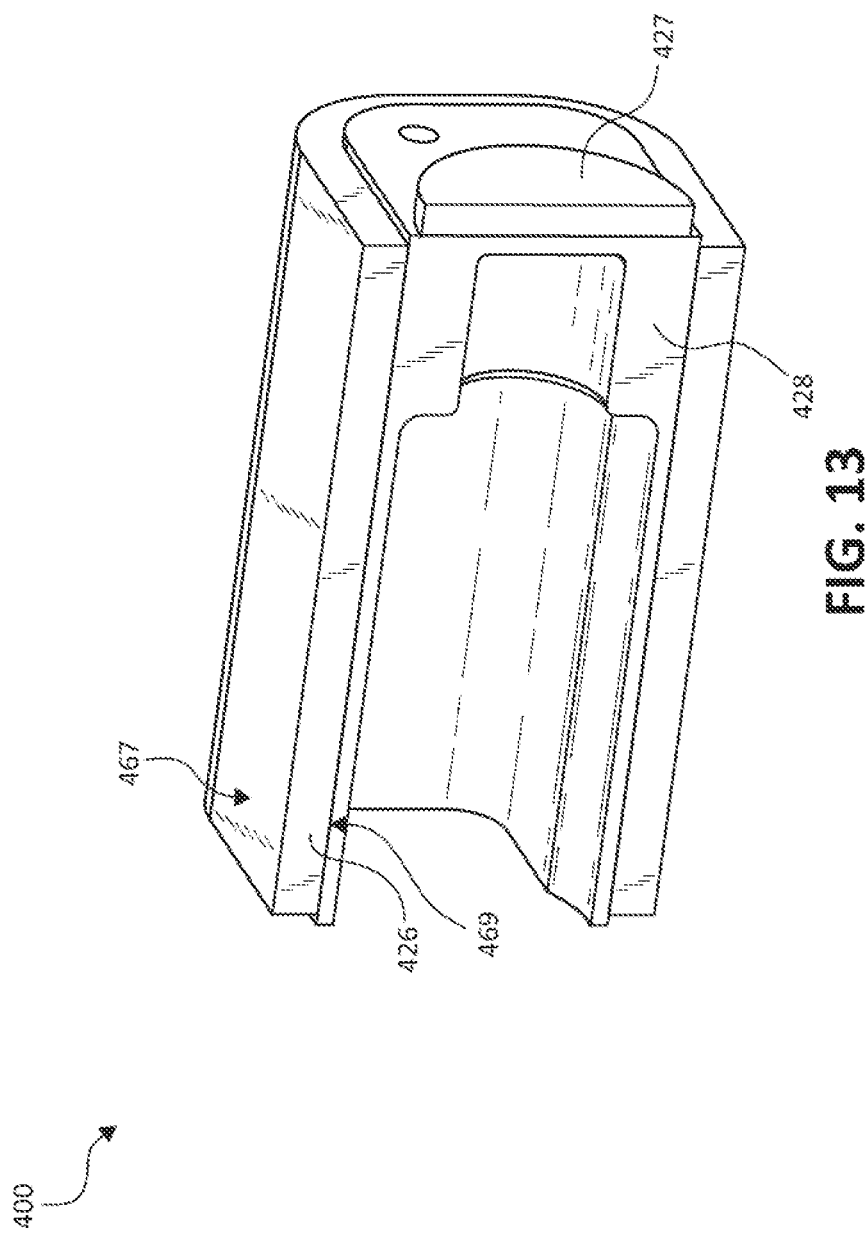
FIG. 13 is a cutaway perspective view of a desiccant, a heater, and a heat sink of the moisture pump of FIG. 11, according to some embodiments.

FIG. 13 is a cutaway perspective view of a desiccant 426, a heater 427, and a heat sink 428 of the moisture pump 400, according to some embodiments of the disclosure. The illustrated desiccant 426 includes one or more surfaces, such as outer surface 467 and inner surface 469. As shown, the heat sink 428 is coupled to and in contact with the inner surface 469 to transfer heat from the heat sink to the desiccant. The heater 427 is coupled to and in contact with the heat sink 428 to transfer heat from the heater to the heat sink and ultimately to the desiccant 426. The heater 427 is positioned outside of the condensation chamber.

Figure 14:
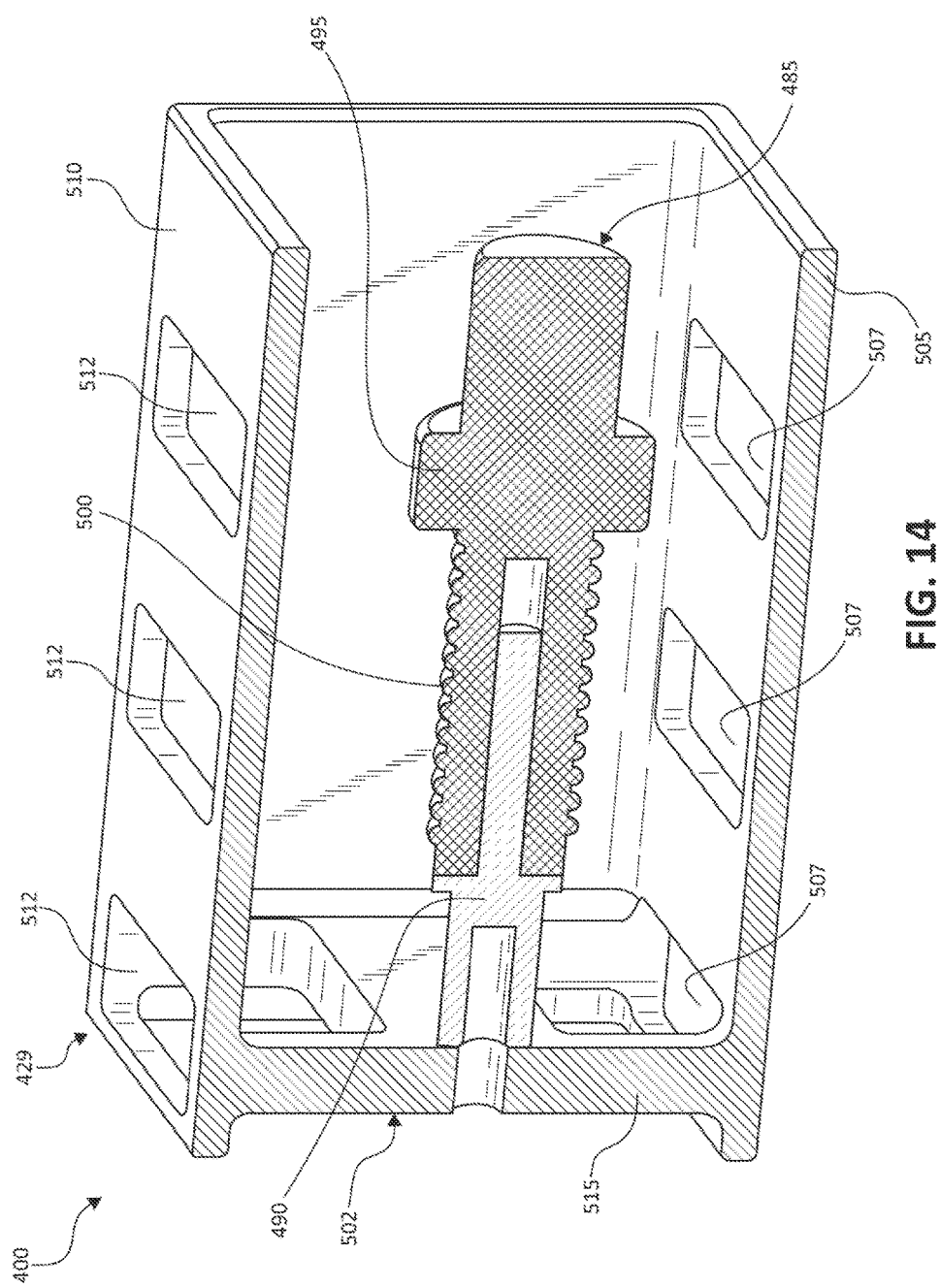
FIG. 14 is a cutaway perspective view of a valve assembly of the moisture pump of FIG. 11, according to some embodiments.

FIG. 14 is a cutaway perspective view of a valve assembly 429 of the moisture pump 400, according to some embodiments of the disclosure. As illustrated, the valve assembly 429 includes actuator 485. The actuator 485 includes a piston 490 and a drive 495 for translating the piston between at least two positions. The valve assembly 429 as shown also includes a spring 500 for biasing the valve assembly, which may be similar to spring 100, and has contracted and extended positions.

In some embodiments, the valve assembly 429 also includes a port covering frame 502. As shown, the port covering frame 502 is coupled to the actuator 485, in particular the piston 490 by a fastener (not shown), to translate in response to movement of the actuator 485.

In some embodiments, the port covering frame 502 is generally in the shape of a rectangular cuboid, and in particular, having two sides open, though other configurations are contemplated. The port covering frame 502 as shown includes an adsorption port cover 505, one or more openings 507 in the adsorption port cover, a desorption port cover 510, one or more openings 512 in the desorption port cover, and a linkage 515 coupled to the port covers 505, 510 and the piston 490.

In the illustrated embodiment, the adsorption port cover 505 forming a side of the rectangular cuboid, the desorption port cover 510 forming an opposite side of the rectangular cuboid, and the linkage 515 extends between the port covers 505,510 and forms at least another side of the rectangular cuboid. As illustrated, two sides of the linkage 515 are shown and a third side of the linkage 515 is cutaway. The openings of the port covers 505, 510 allow for selective transmission of water vapor through the port covering frame 502. The linkage 515 shown also includes one or more openings to allow water vapor transmission throughout the heating chamber when assembled.

Figure 15:
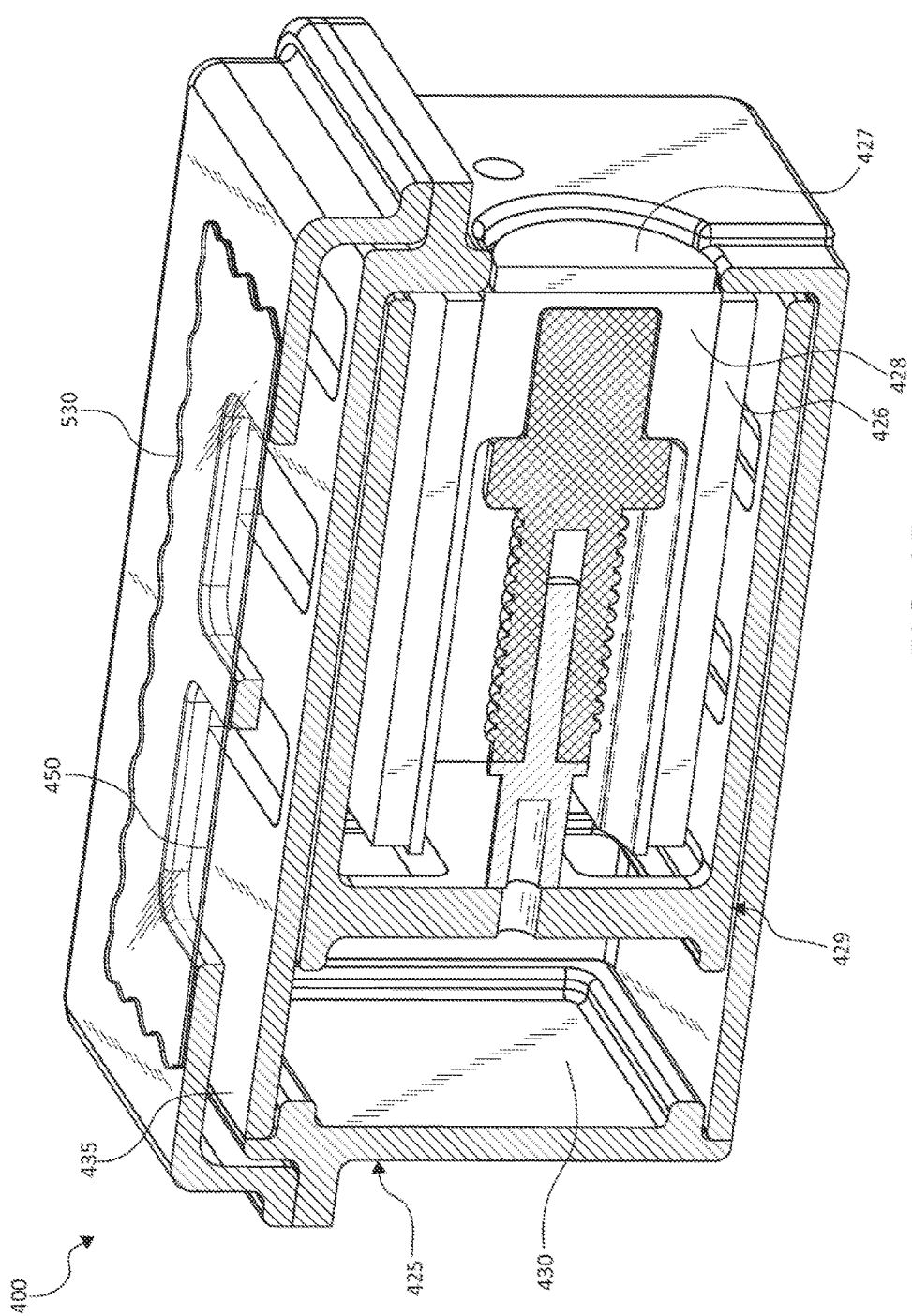
FIG. 15 is a cutaway perspective view of the assembled moisture pump of FIG. 11, according to some embodiments.

FIG. 15 is a cutaway perspective view of the assembled moisture pump 400, according to some embodiments of the disclosure. The desiccant 426, heater 427, heat sink 428, and valve assembly 429 are maintained directly or indirectly by the pump housing 425. In some embodiments, the heater 427 is positioned in or maintained in the heating chamber 430. The valve assembly 429 selectively transitions to cover one of the adsorption port 440 and the desorption port 445 at a time. Covering inhibits the transmission of water vapor. As shown, the entire valve assembly 429 is positioned in the heating chamber 430. The valve assembly 429 slides to align one or more openings with one or more ports.

The heater 427 as illustrated is at least partially disposed in an opening in the pump housing 425. The desiccant 426 is positioned in the heating chamber 429 and is exposed thereto to adsorb moisture in the heating chamber.

The moisture pump 400 further includes a membrane 530 positioned to cover the venting port 450. In some embodiments, membrane 530 is similar to membranes 130. In some embodiments (not shown), a membrane is positioned to cover the adsorption port 440 (FIG. 12) between the pump housing 425 and an inside environment (e.g., inside environment 16 of FIG. 1) to prevent particles freed from the desiccant 426 from entering an inside environment, for example, which may be similar to membrane 135 (FIG. 5).

Figure 16:
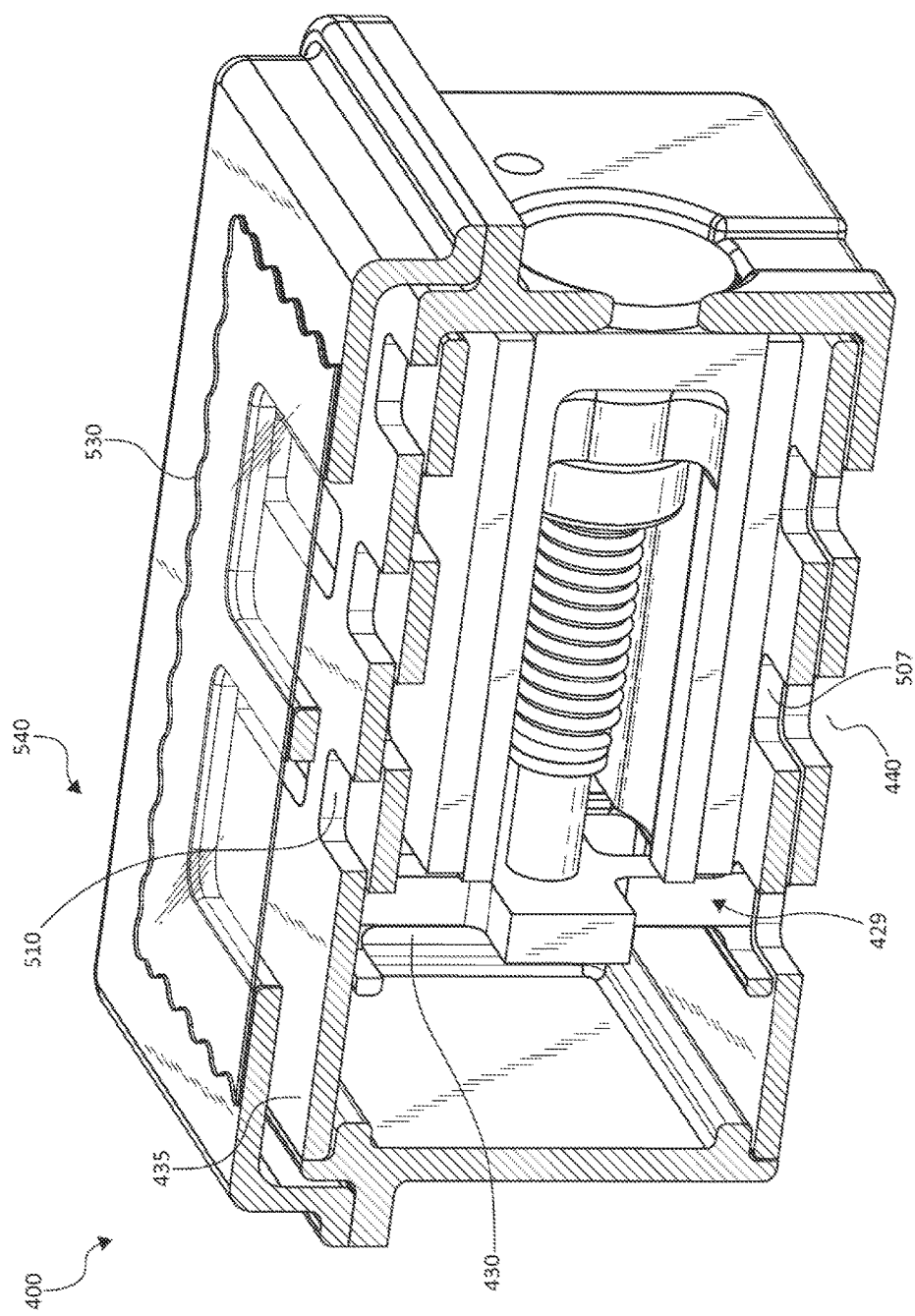
FIGS. 16 & 17 are cutaway perspective views of the assembled moisture pump of FIG. 11 showing an adsorption position and a desorption position, respectively, according to some embodiments.
Figure 17:
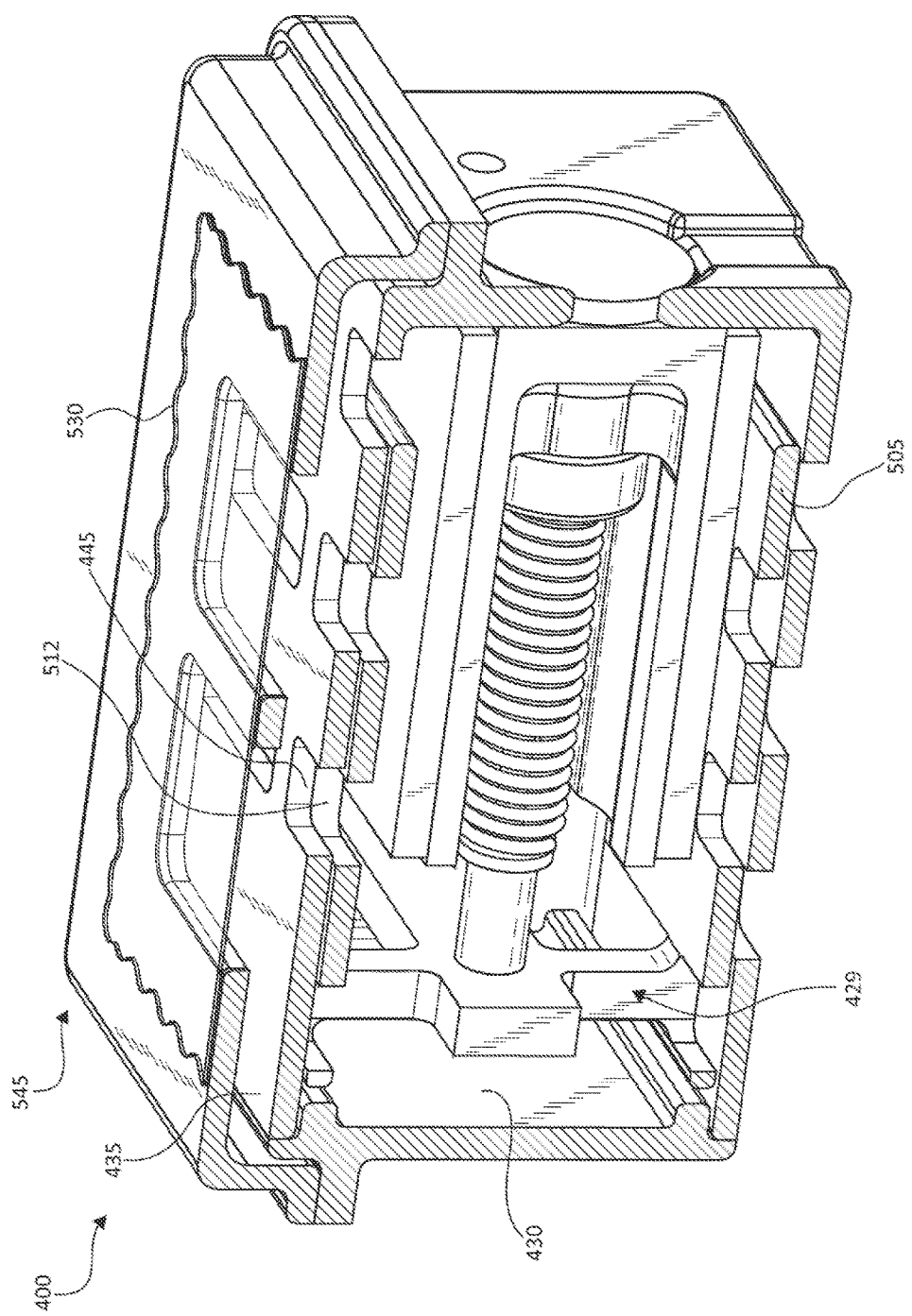

FIGS. 16 & 17 are cutaway perspective views of the assembled moisture pump 400 showing an adsorption position 540 and a desorption position 545, respectively, according to some embodiments of the disclosure. During an adsorption cycle, the valve assembly 429 is transitioned to an adsorption position 540 such that the one or more openings 507 of the valve assembly 429 are aligned with the adsorption port 440 to open the adsorption port, and the desorption port 510 is sealed by the port covering frame of the valve assembly. In response to diffusion, for example, water vapor is transmitted through the adsorption port 440 into the heating chamber 430 while being inhibited from being transmitted out of the heating chamber and into the condensation chamber 435. The desiccant adsorbs the water vapor.

During an exemplary heating cycle, the valve assembly 429 is transitioned into a desorption position 545 such that the one or more openings 512 of the valve assembly 429 are aligned with the desorption port 445 to open the desorption port, and the adsorption port 505 is sealed by the port covering frame of the valve assembly. In response to the heater being on, moisture adsorbed by the desiccant enters the air of the heating chamber 430 as water vapor. Water vapor is transmitted through the desorption port 445 into the condensation chamber 435 while being inhibited from being transmitted through the adsorption port 440. The condensation chamber 435 allows for the water vapor to exit through the membrane 530 on the venting port and encourages cooling and condensation of the water vapor.

In some embodiments, during an evaporation cycle, when the moisture pump 400 transitions to the adsorption position 540, the liquid moisture in the condensation chamber 435 will evaporate over time and exit the condensation chamber through membrane 530. The desiccant 426 is able to continue to adsorb water vapor in the heating chamber 430.

EXAMPLES

The present invention will be better understood in view of the following non-limiting examples.

Example 1

Figure 18:
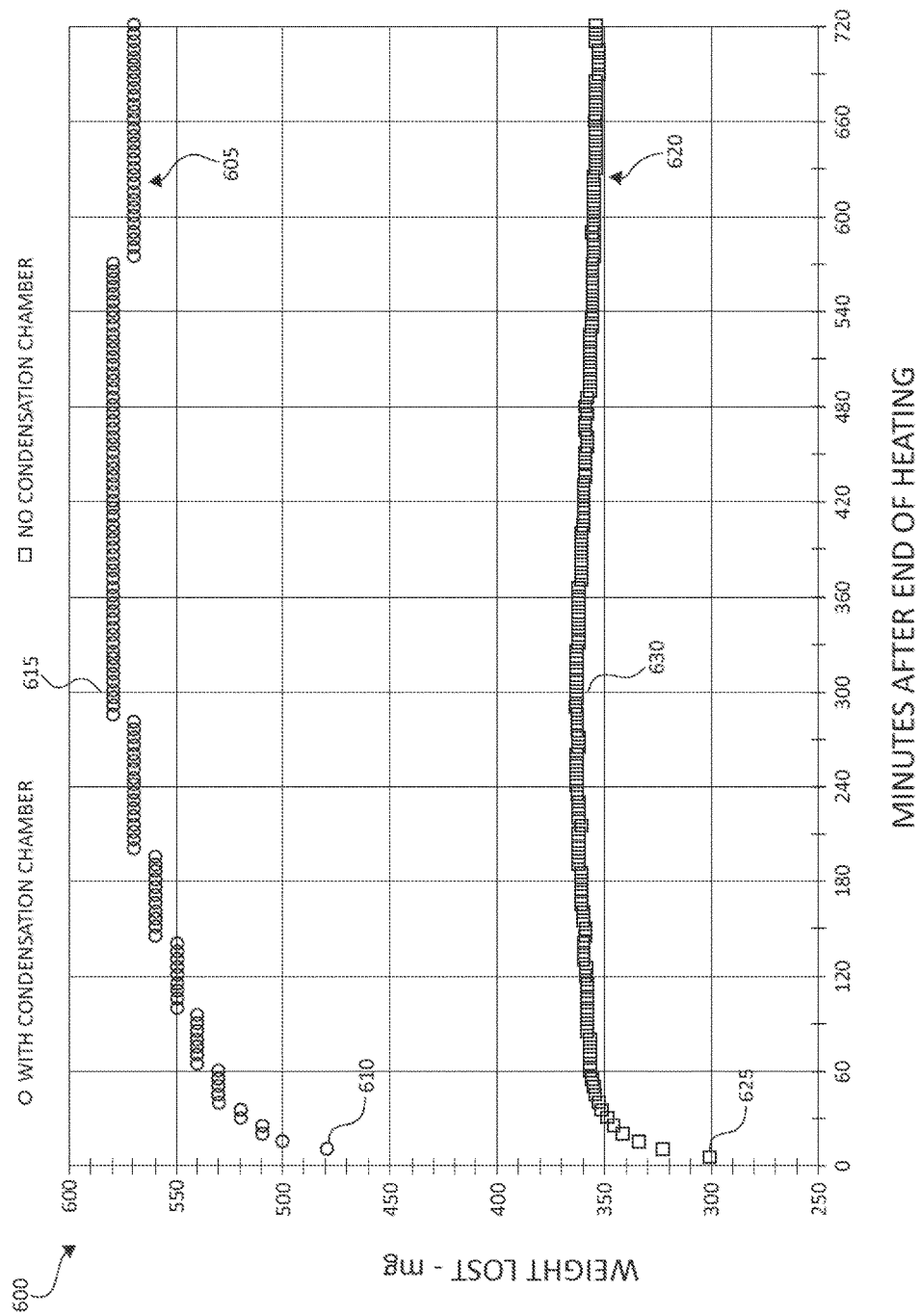
FIG. 18 is a schematic illustration of test data of a moisture pump having a condensation chamber versus a moisture pump without a condensation chamber, according to some embodiments.

FIG. 18 is a graphical representation 600 of test data of a moisture pump having a condensation chamber versus a moisture pump without a condensation chamber, according to some embodiments of the disclosure. The presence of the condensation chamber in the embodiments of the disclosure facilitate the condensation of water vapor, thereby pulling water vapor out of the air between the heating chamber and the condensation chamber and providing an extended duration of time for the water to evaporate and leave the moisture pump while the heater is off.

A moisture pump (similar to any of the moisture pumps 20, 200, or 400) having a condensation chamber and a moisture pump without a condensation chamber were subjected to the testing method that follows. Each moisture pump was placed in an environmental chamber without a membrane set at 25 degrees Celsius and 80% relative humidity (RH) for at least 24 hours to saturate the desiccant with moisture. The adsorption ports were blocked, for example, by water vapor impermeable adhesive.

After being saturated, a membrane was adhered to each device and an initial weight was recorded outside of the environmental chamber on a weighing balance at 22 degrees Celsius at 50% RH. Each heater was activated for a 20 minute heating cycle at a temperature of 135 degrees Celsius.

After the heating cycle, subsequent weight measurements of each moisture pump were recorded at 5 minute intervals for about 10 hours in an evaporation cycle with the heater off.

The graphical representation 600 is a weight loss graph illustrating weight lost (milligrams) in each moisture pump (with and without condensation chamber) during the evaporation cycle. The weight lost represents the venting of moisture out of the moisture pump that was once stored in the desiccant.

Scatterplot 605 represents the mass lost for the moisture pump having a condensation chamber. As shown, this moisture pump lost about 480 milligrams at the end of the heating cycle and beginning of the evaporation cycle at measurement 610. Then, at about 300 minutes, a total of about 580 milligrams of weight was lost at measurement 615. The evaporation cycle encouraged up to about 100 milligrams of moisture (about 20.8% more moisture) to leave the moisture pump having the condensation chamber.

Scatterplot 620 represents the mass lost for the moisture pump without a condensation chamber. As shown, this moisture pump lost about 300 milligrams the end of the heating cycle and beginning of the evaporation cycle at measurement 625. Then, at about 300 minutes, a total of about 360 milligrams of weight was lost at measurement 630. The evaporation cycle encouraged up to about 60 milligrams of moisture (about 20% more moisture) to leave the moisture pump without the condensation chamber, but only about 60 milligrams.

In comparison, assuming that almost all of the moisture in each moisture pump was adsorbed by the respective desiccants before the heating cycle, the moisture pump having the condensation chamber showed greater than about 10% more weight of water lost than the moisture pump without the condensation chamber under the same conditions and after about 300 minutes. In particular, the moisture pump having the condensation chamber showed about a 60% greater weight of water lost after the heating cycle and about a 61% greater weight of water lost overall under the same conditions at about 300 minutes. Thus, experimental data shows that the presence of the condensation chamber, such as that according to the embodiments described herein, improves the moisture desorption efficiency of the desiccant of a moisture pump according to the instant disclosure. Moisture desorption efficiency is defined as the weight of water desorbed from the desiccant versus the weight of water adsorbed into the desiccant. In addition, the data shows that the presence of the condensation chamber encourages more moisture weight to evaporate moisture after the heating cycle. Furthermore, the presence of the condensation chamber allows for the moisture pump to concurrently evaporate moisture from the condensation chamber while adsorbing moisture in the heating chamber from an inside environment of an enclosure.

Example 2

Figure 19:
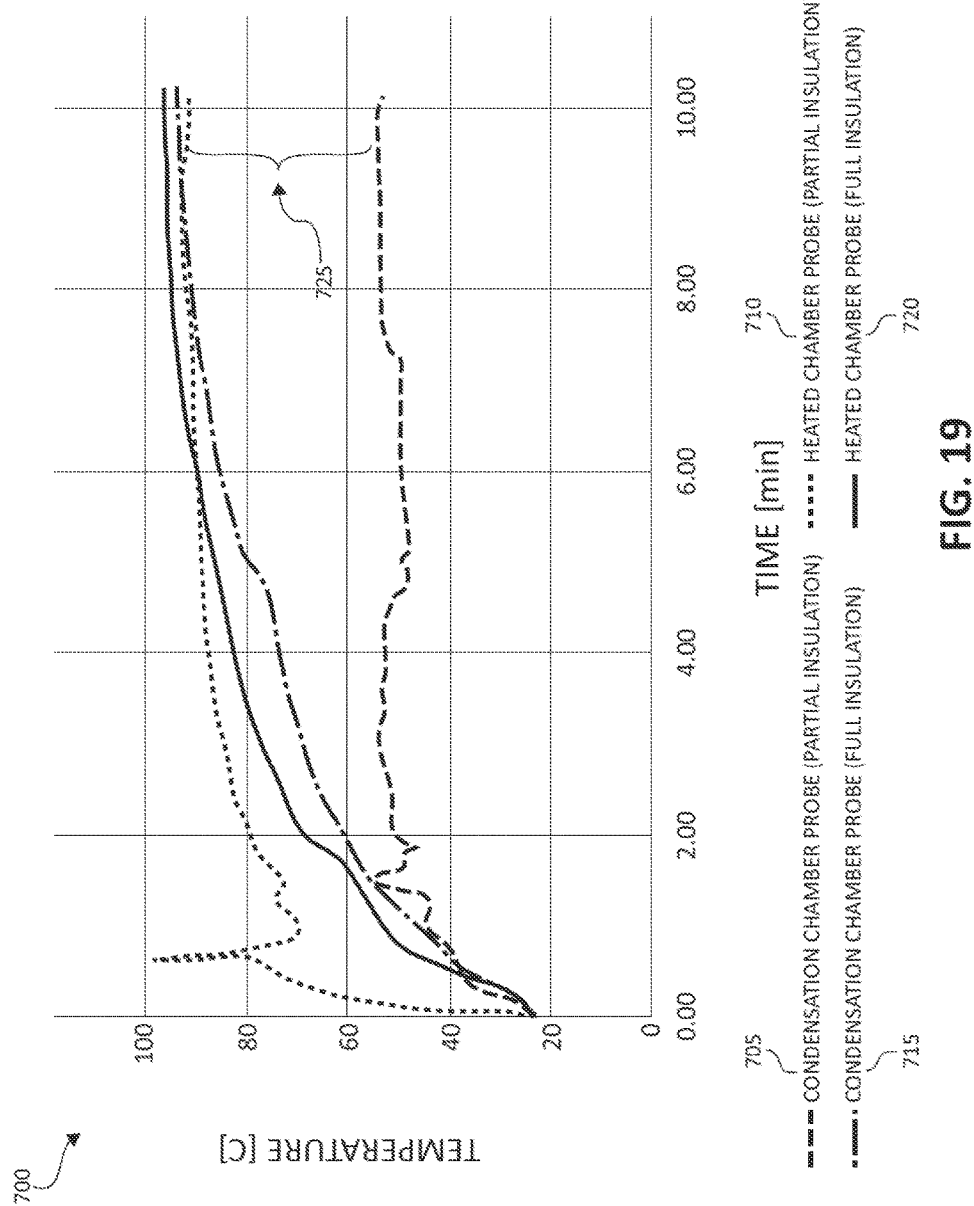
FIG. 19 is a schematic illustration of test data of a moisture pump prototype simulating an insulated heating chamber only versus a moisture pump prototype simulating full insulation, according to some embodiments.

FIG. 19 is a graphical representation 700 of test data of a moisture pump prototype simulating an insulated heating chamber only (such as moisture pump 200) versus a moisture pump prototype simulating full insulation, according to some embodiments of the disclosure. The presence of the insulation for the heating chamber encourages the heat to stay in the heating chamber adjacent to the desiccant. As indicated by the experimental data, insulation around the heating chamber improves the temperature differential between the chambers, allowing the condensation chamber to stay cooler while the heating chamber is heated, thereby encouraging condensation of water vapor in the condensation chamber while desorbing the desiccant with heat. As previously described, insulation may be applied to any of the embodiments contemplated by this disclosure.

A moisture pump prototype simulating partial insulation (around the heating chamber, such as moisture pump 200) and a moisture pump prototype simulating full insulation (around the heating chamber and condensation chamber) were subjected to the testing method as follows. The prototypes each included a heating chamber having a heater, a heat sink, a desiccant made of silica gel type A beads glued to the heat sink positioned therein and a heating chamber about 1 cubic centimeter (cm$^3$) in volume. The chambers were separated by a passage about 30 millimeters (mm) in diameter and about 5 mm in length. The test insulation comprised cotton and air.

The heating chamber of each prototype was placed in an environment chamber set at 25 degrees Celsius and 80% relative humidity (RH) for about 72 hours to saturate the desiccant with moisture.

After being saturated, an initial weight of each prototype was recorded outside of the environmental chamber on a weighing balance at 22 degrees Celsius and 50% RH.

Then, the respective condensation chamber was attached to each prototype. Each heater was activated for a 10 minute heating cycle at a temperature of 135 degrees Celsius.

At the end of the heating cycle, the respective condensation chambers were detached from the heating chambers and the final weight of each heating chamber was recorded. The prototype simulating partial insulation (insulation around the heating chamber only) showed about 15% more weight loss than the other prototype (284 milligrams of weight lost versus 246 milligrams of weight lost). The presence of the condensation chamber improves the moisture desorption efficiency of the desiccant.

The graphical representation 700 is a temperature graph showing the temperature measured in degrees Celsius measured in the condensation chamber and the heating chamber of each prototype during the heating cycle. The scatterplots 705, 710 represent the temperature of the condensation chamber and the heating chamber, respectively, in the partial insulation prototype. The scatterplots 715, 720 represent the temperature of the condensation chamber and the heating chamber, respectively, in the full insulation prototype.

As can be seen, at about 10 minutes, the temperature differential 725 between chambers in the partial insulation prototype is about 35 degrees Celsius (about 55 deg. C. to 90 deg. C.). In contrast, the temperature differential between the chambers in the full insulation prototype is at most 5 degrees Celsius, if not less, at about 10 minutes. As indicated by the experimental data, the presence of insulation around the heating chamber helped to improve moisture desorption efficiency of the desiccant.

Various modifications and additions can be made to the exemplary embodiments discussed without departing from the scope of the present invention. While the embodiments described above refer to particular features, the scope of this invention also includes embodiments having different combinations of features and embodiments that do not include all of the above described features. For example, the modifications described with respect to each moisture pump 20, 200, 400 may also be applied to any of the moisture pump embodiments described herein.

The following is claimed:

1. An apparatus, comprising:
   a housing defining a heating chamber and a condensation chamber, the housing having an adsorption port into the heating chamber, a desorption port between the heating chamber and the condensation chamber, and a venting port out of the condensation chamber;
   a desiccant positioned in the heating chamber;
   a heater maintained in the heating chamber and configured to heat the heating chamber; and
   a valve assembly maintained by the housing and transitionable between:
      an adsorption position in which the valve assembly seals the desorption port between the heating chamber and the condensation chamber and opens the adsorption port into the heating chamber for water vapor transmission into the heating chamber, and
      a desorption position in which the valve assembly seals the adsorption port and opens the desorption port between the heating chamber and the condensation chamber for water vapor transmission out of the heating chamber, wherein the heater is stationary within the housing during transition of the valve assembly.

2. The apparatus of claim 1, wherein the heater is positioned outside the condensation chamber.

3. The apparatus of claim 1, wherein the heater is positioned in the heating chamber.

4. The apparatus of claim 1, further comprising a heat sink in conductive contact with the heater and the desiccant.

5. The apparatus of claim 4, wherein the heat sink is in conductive contact with one of an inner surface or an outer surface of the desiccant.

6. The apparatus of claim 1, wherein the valve assembly includes an actuator configured to transition the valve assembly relative to the housing.

7. The apparatus of claim 1, wherein the valve assembly further includes an adsorption port cover configured to seal the adsorption port in the desorption position and a desorption port cover configured to seal the desorption port in the adsorption position.

8. The apparatus of claim 1, further including a condensation surface exposed to the condensation chamber.

9. The apparatus of claim 8, wherein the condensation surface comprises a portion of the housing exposed to the condensation chamber.

10. The apparatus of claim 1, further comprising an insulator structured to insulate the heating chamber.

11. The apparatus of claim 10, wherein the insulator is positioned in the housing and adjacent to the heating chamber.

12. The apparatus of claim 1, further including a membrane positioned between the housing and an inside environment configured to prevent particles freed from the desiccant from entering the inside environment.

13. An apparatus, comprising:
a housing defining a heating chamber and a condensation chamber, the housing having an adsorption port into the heating chamber, a desorption port between the heating chamber and the condensation chamber, a venting port out of the condensation chamber;
a membrane covering the venting port, the membrane being water vapor permeable and liquid water impermeable;
a desiccant positioned in the heating chamber;
a heater maintained in the heating chamber and configured to heat the heating chamber;
a valve assembly maintained by the housing including an adsorption port cover and a desorption port cover, the desorption port cover positioned in the condensation chamber, the valve assembly transitionable between:
an adsorption position in which the valve assembly seals the desorption port between the heating chamber and the condensation chamber with the desorption port cover and opens the adsorption port into the heating chamber for water vapor transmission into the heating chamber, and
a desorption position in which the valve assembly seals the adsorption port with the adsorption port cover and opens the desorption port between the heating chamber and the condensation chamber for water vapor transmission out of the heating chamber, wherein the heater is stationary within the housing during transition of the valve assembly.

14. The apparatus of claim 13, wherein the valve assembly includes at least one linkage coupled between the desorption port cover and the adsorption port cover.

15. The apparatus of claim 13, wherein the valve assembly includes a linkage coupled between the actuator and the adsorption port cover.

16. The apparatus of claim 13, wherein the housing further defines a debris chamber, the housing further including an intake port for water vapor transmission into the debris chamber, the adsorption port between the heating chamber and the debris chamber for water vapor transmission out of the debris chamber, the adsorption port cover positioned in the debris chamber.

17. The apparatus of claim 13, wherein at least one of the adsorption port cover and the desorption port cover includes a gasket.

18. An apparatus, comprising:
a housing defining a heating chamber and a condensation chamber, the housing having an adsorption port into the heating chamber, a desorption port between the heating chamber and the condensation chamber, a venting port out of the condensation chamber;
a membrane covering the venting port, the membrane being water vapor permeable and liquid water impermeable;
a desiccant positioned in the heating chamber;
a heater maintained in the heating chamber and configured to heat the heating chamber;
a valve assembly maintained by the housing including a port covering frame positioned in the heating chamber, the valve assembly transitionable between:
an adsorption position in which the valve assembly seals the desorption port between the heating chamber and the condensation chamber with the port covering frame and opens the adsorption port into the heating chamber for water vapor transmission into the heating chamber, and
a desorption position in which the valve assembly seals the adsorption port with the port covering frame and opens the desorption port between the heating chamber and the condensation chamber for water vapor transmission out of the heating chamber, wherein the heater is stationary within the housing during transition of the valve assembly.

19. The apparatus of claim 18, wherein the valve assembly includes one or more openings and is configured to transition by sliding the one or more openings into alignment with one of the adsorption port and the desorption port.

20. The apparatus of claim 18, wherein the housing includes a heating body and a condensation body, the apparatus further includes a condensation surface exposed to the condensation chamber including an exterior surface of the heating body and an interior surface of the condensation body.

21. The apparatus of claim 1, wherein the housing is a modular element configured to attach with a port of an inside environment for removing moisture from the inside environment to an outside environment.

* * * * *